United States Patent
Shannon et al.

(10) Patent No.: US 6,749,721 B2
(45) Date of Patent: Jun. 15, 2004

(54) PROCESS FOR INCORPORATING POORLY SUBSTANTIVE PAPER MODIFYING AGENTS INTO A PAPER SHEET VIA WET END ADDITION

(75) Inventors: Thomas Gerard Shannon, Neenah, WI (US); Mike Thomas Goulet, Neenah, WI (US); Dana Stephanie Kass, Stillwater, MN (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 340 days.

(21) Appl. No.: 09/747,393

(22) Filed: Dec. 22, 2000

(65) Prior Publication Data

US 2002/0134521 A1 Sep. 26, 2002

(51) Int. Cl.$^7$ .................... D21M 17/33; D21M 21/18
(52) U.S. Cl. ................ 162/164.4; 162/164.1; 162/168.1; 162/168.2; 162/168.3; 162/109; 162/123; 162/129; 162/130
(58) Field of Search .................. 162/164.4, 164.1, 162/109, 112, 123, 129, 130, 168.1, 168.2, 168.3

(56) References Cited

U.S. PATENT DOCUMENTS

| | | |
|---|---|---|
| 1,812,832 A | 6/1931 | Rafton |
| 3,056,714 A | 10/1962 | Feigley, Jr. et al. |
| 3,128,311 A | 4/1964 | Shirley et al. |
| 3,152,998 A | 10/1964 | Moss |
| 3,155,728 A | 11/1964 | Lesesne |
| 3,236,895 A | 2/1966 | Lee et al. |
| 3,322,725 A * | 5/1967 | Hunter et al. |
| 3,347,926 A | 10/1967 | Zech |
| 3,436,359 A | 4/1969 | Hubin et al. |
| 3,556,932 A | 1/1971 | Coscia et al. |
| 3,654,370 A | 4/1972 | Yeakey |
| 3,671,502 A | 6/1972 | Samour et al. |
| 3,677,886 A | 7/1972 | Forssblad et al. |
| 3,770,575 A | 11/1973 | Ball |
| 3,779,912 A * | 12/1973 | Redmore et al. |
| 3,994,771 A | 11/1976 | Morgan, Jr. et al. |
| 4,014,736 A | 3/1977 | Sexton |
| 4,014,933 A | 3/1977 | Boettger et al. |
| 4,049,493 A | 9/1977 | Lare |
| 4,081,319 A | 3/1978 | Conway |
| 4,093,506 A | 6/1978 | Richter |
| 4,144,122 A | 3/1979 | Emanuelsson et al. |
| 4,153,581 A | 5/1979 | Habermann |
| 4,251,410 A * | 2/1981 | Danner et al. |
| 4,310,384 A | 1/1982 | Meredith et al. |
| 4,448,638 A | 5/1984 | Klowak |
| 4,481,076 A | 11/1984 | Herrick |
| 4,481,077 A | 11/1984 | Herrick |
| 4,482,429 A | 11/1984 | Klowak |
| 4,508,594 A * | 4/1985 | Jansma et al. |
| 4,521,490 A | 6/1985 | Pocius et al. |
| 4,618,448 A | 10/1986 | Cha et al. |
| 4,764,418 A | 8/1988 | Kuenn et al. |
| 4,766,245 A | 8/1988 | Larkin et al. |
| 4,808,266 A | 2/1989 | Faurie |
| 4,824,689 A | 4/1989 | Kuenn et al. |
| 4,908,101 A | 3/1990 | Frisk et al. |
| 4,921,902 A | 5/1990 | Evani et al. |
| 4,929,670 A | 5/1990 | Billmers et al. |
| 4,959,125 A | 9/1990 | Spendel |
| 4,969,976 A | 11/1990 | Reed |
| 4,986,882 A | 1/1991 | Mackey et al. |
| 5,035,772 A | 7/1991 | Agnemo et al. |
| 5,087,324 A | 2/1992 | Awofeso et al. |

(List continued on next page.)

FOREIGN PATENT DOCUMENTS

| | | |
|---|---|---|
| EP | 0 109 282 A2 | 5/1984 |
| EP | 0 226 408 B1 | 7/1991 |
| EP | 0 613 979 A1 | 9/1994 |
| EP | 0 643 164 B1 | 11/1997 |
| EP | 0 851 062 A2 | 7/1998 |
| WO | WO 89/02952 A1 | 4/1989 |
| WO | WO 90/12146 A1 | 10/1990 |
| WO | WO 94/19534 A1 | 9/1994 |
| WO | WO 95/01479 A1 | 1/1995 |
| WO | WO 95/20066 A1 | 7/1995 |
| WO | WO 96/06223 A1 | 2/1996 |
| WO | WO 97/13026 A1 | 4/1997 |
| WO | WO 98/09021 A1 | 3/1998 |
| WO | WO 98/16570 A1 | 4/1998 |
| WO | WO 98/17864 A1 | 4/1998 |
| WO | WO 98/23814 A1 | 6/1998 |
| WO | WO 98/35095 A1 | 8/1998 |
| WO | WO 99/34057 A1 | 7/1999 |

OTHER PUBLICATIONS

Roberts, J. C., "Paper Chemistry," 1996, Blackie Academic & Professional, Glasgow XP002210178, Chapter 7, Wet–Strength Chemistry, Point 7.3.4, Glyoxalated Polyacrylamide Resins, pp. 107–110.

Kawabata, S., "The standardization and analysis of hand evaluation", *The Textile Machinery Society of Japan*, Jul. 1980, 2nd Ed., Osaka, Japan, pp. 28–51.

*Organic Synthesis*, Collective vol. 4, 1963, pp. 401–403.

D.N. Schulz, et al., "Copolymers of acrylamide and surfactant macromonomers: synthesis and solution properties", *Polymer*, vol. 28, 1987, pp. 2110–2115.

*Organic Synthesis*, Collective vol. 4, pp. 401–403, John Wiley & Sons, Inc., 1963.

Primary Examiner—Peter Chin
(74) Attorney, Agent, or Firm—Patricia A. Charlier

(57) ABSTRACT

Synthetic co-polymers having moieties capable of forming hydrogen bonds, ionic bonds, or covalent bonds with cellulose fibers and paper modifying moieties capable of modifying a paper sheet are disclosed. These synthetic co-polymers are derived from the reaction of an aldehyde functional polymer and an aldehyde reactive paper modifying agent containing a non-hydroxyl aldehyde reactive functional group.

67 Claims, No Drawings

U.S. PATENT DOCUMENTS

| | | |
|---|---|---|
| 5,127,994 A | 7/1992 | Johansson |
| 5,137,600 A | 8/1992 | Barnes et al. |
| 5,139,671 A | 8/1992 | Henricson et al. |
| 5,143,999 A | 9/1992 | Setiabudi et al. |
| 5,177,165 A | 1/1993 | Valint, Jr. et al. |
| 5,187,219 A | 2/1993 | Furman, Jr. |
| 5,221,434 A | 6/1993 | Henricson |
| 5,238,501 A | 8/1993 | Kappel et al. |
| 5,348,620 A | 9/1994 | Hermans et al. |
| 5,362,415 A | 11/1994 | Egraz et al. |
| 5,397,435 A | 3/1995 | Ostendorf et al. |
| 5,405,501 A | 4/1995 | Phan et al. |
| 5,435,919 A | 7/1995 | Ladika et al. |
| 5,437,766 A | 8/1995 | Van Phan et al. |
| 5,494,554 A | 2/1996 | Edwards et al. |
| 5,501,768 A | 3/1996 | Hermans et al. |
| 5,552,020 A | 9/1996 | Smith et al. |
| 5,575,891 A | 11/1996 | Trokhan et al. |
| 5,585,456 A | 12/1996 | Dulany et al. |
| 5,591,306 A | 1/1997 | Kaun |
| 5,603,804 A | 2/1997 | Hansen et al. |
| 5,607,551 A | 3/1997 | Farrington, Jr. et al. |
| 5,612,409 A * | 3/1997 | Chrobaczek et al. |
| 5,618,483 A | 4/1997 | Weigel et al. |
| 5,624,532 A | 4/1997 | Trokhan et al. |
| 5,633,300 A | 5/1997 | Dasgupta |
| 5,656,132 A | 8/1997 | Farrington, Jr. et al. |
| 5,667,636 A | 9/1997 | Engel et al. |
| 5,672,248 A | 9/1997 | Wendt et al. |
| 5,674,362 A | 10/1997 | Underwood et al. |
| 5,695,607 A | 12/1997 | Oriaran et al. |
| 5,723,022 A | 3/1998 | Dauplaise et al. |
| 5,725,736 A | 3/1998 | Schroeder et al. |
| 5,746,887 A | 5/1998 | Wendt et al. |
| 5,772,845 A | 6/1998 | Farrington, Jr. et al. |
| 5,783,041 A | 7/1998 | Underwood |
| 5,785,813 A | 7/1998 | Smith et al. |
| 5,807,944 A | 9/1998 | Hirt et al. |
| 5,874,495 A | 2/1999 | Robinson |
| 6,059,928 A | 5/2000 | Van Luu et al. |

* cited by examiner

PROCESS FOR INCORPORATING POORLY SUBSTANTIVE PAPER MODIFYING AGENTS INTO A PAPER SHEET VIA WET END ADDITION

BACKGROUND OF THE INVENTION

In the manufacture of paper products, such as facial tissue, bath tissue, paper towels, dinner napkins and the like, a wide variety of product properties are imparted to the final product through the use of chemical additives. Examples of such chemical additives include softeners, debonders, wet strength agents, dry strength agents, sizing agents, opacifiers and the like. In many instances, more than one chemical additive is added to the product at some point in the manufacturing process. Unfortunately, there are instances where certain chemical additives may not be compatible with each other or may be detrimental to the efficiency of the papermaking process, such as can be the case with the effect of wet end chemical additives on the downstream efficiency of creping adhesives. Another limitation, which is associated with wet end chemical addition, is the need for the chemical additives to possess a charge, cationic, anionic or amphiphilic, but preferably cationic. The cationic charge is attracted to the anionic charge of the cellulose fibers allowing for the material to be retained on the cellulose fibers. Where anionic materials are used, a cationic promoter is required to retain the chemical on the fibers. Another limitation associated with wet end addition is the limited availability of adequate bonding sites on the cellulose papermaking fibers to which the chemical additives can attach themselves. Under such circumstances, more than one chemical functionality competes for the limited available bonding sites, oftentimes resulting in the insufficient retention of one or both chemical additives on the cellulose fibers.

A cellulose papermaking fiber primarily contains two types of functional groups, hydroxyl and carboxyl. At a typical papermaking pH of about 4 to about 9, a portion of the carboxyl groups are ionized causing the cellulose papermaking fibers to possess a net anionic charge. These anionic sites on the cellulose fibers serve as the source of attachment for wet end chemical additives. The amount of carboxyl groups on the cellulose fibers is limited and depends on the nature of the pulp. In general bleached kraft pulps contain about 2 to about 4 milli equivalents of carboxyl per 100 grams of pulp while mechanical pulps may contain upwards of about 30 to about 40 milli equivalents of carboxyl groups per 100 grams of pulp.

Most wet end chemical additives used in papermaking rely on ionic bonding for retention of the additive to the papermaking fibers. In general, the chemical additives will possess a positive charge somewhere on the molecule. The positive charge is attracted to the negative charge on the cellulose fibers and an ionic bond retains the chemical additives on the cellulose fibers. Where anionic chemical additives are used, a cationic promoter will be used to bridge the anionic chemical additive and the anionic sites on the cellulose fibers. The limited number of carboxyl groups on the cellulose fiber limits the amount of chemical additives that can be retained on the cellulose fibers. Also, where more than one chemical additive is used in the wet end, competition between the two chemical additives for the limited number of bonding sites on the cellulose fibers can result in inconsistent retention leading to variable product performance.

When added in the wet end, non-ionic chemical additives show poor retention to the cellulose papermaking fibers. An option to circumvent this issue is to covalently bond the molecule to the cellulose fibers in some way. A problem with covalent bonding to cellulose lies in the type of groups on the cellulose fibers that are available for reaction. The two chemically active groups on the cellulose fibers are hydroxyls and carboxyls. The carboxyl groups are generally too few in number and too low in reactivity to be useful. Also, any reaction at the carboxyl group will reduce the number of available ionic bonding sites on the cellulose fibers hence limiting the ability to retain any charged wet end chemical additives that may need to be used. The hydroxyl groups, while plentiful, are problematic in that anything that can react with a hydroxyl group can also react with water. In a typical papermaking process, on a molar basis, the amount of the hydroxyl groups on water available for reaction is magnitudes of order larger than the amount of the hydroxyl groups of the cellulose fibers available for reaction. Simple kinetics will therefore dictate a preference for reaction with water hydroxyl groups over the cellulose fiber hydroxyl groups. This problem can be overcome as exemplified with the sizing agents ASA (alkyl succinic anhydride) and AKD (alkyl ketene dimer). However, complicated and expensive emulsification must be performed in order to allow addition of these chemical additives to the wet-end of the process. The costs become prohibitively high for use in tissue. Additionally, such materials generally react with the hydroxyl groups of the cellulose fibers only after the forming process and removal of a majority of the water. Therefore the emulsions are cationic and the chemical additive is retained in the non-reacted state due to the attraction of the cationic emulsion for the anionic sites of the cellulose fibers. Hence, even in this case the amount of anionic sites on the cellulose fibers available for bonding with other charged wet end chemical additives is reduced.

Since softness and strength are both desirable traits in a tissue sheet, these traits are usually developed in combination within the tissue sheet by the addition of two separate chemical additives of the types described previously. A paper or tissue product normally contains, among other things, a mixture of hardwood and softwood cellulose fibers, as well as a chemical additive to increase strength and a chemical additive to increase softness. However, the way in which the softness and strength chemical additives bind to cellulose fibers is a problem. In order to be retained on the fibers, both softness and strength additives are usually cationic in nature, binding to the anionic sites in the cellulose fibers. Thus, the number of anionic sites on the cellulose fibers control the number of cationic molecules that can attach to the cellulose fibers. Most Kraft pulps typically contain only about 2 to about 3 milli-equivalents of anionic sites per 100 grams of cellulose fiber. However, the number of anionic sites actually on the surface of the fibers available for reacting with the chemical additives may be significantly lower.

Another problem with using positively charged paper modifying or debonder chemical additives is that these chemical additives must compete with cationic strength chemical additives for the limited anionic bonding sites on the cellulose fibers. This competition may result in unpredictable retention of the paper modifying and strength chemical additives, thereby providing a tissue product having varying softness and strength traits. In an alternative application, one of the chemical additives, typically the paper modifying chemical additive, can be incorporated to the tissue sheet after the sheet formation step by spraying or coating the chemical additive onto the tissue sheet. The chemical additive so applied then reacts with the anionic bonding sites on the surface of the cellulose fibers located on the surface of the tissue sheet. However, this approach can require the installation of the application equipment as well as engineering controls required to minimize airborne chemical exposure.

Another approach for treating paper or tissue products involves the covalent bonding of the chemical additives to the cellulose fibers. A problem with the covalent bonding of the chemical additives to the cellulose fibers resides in the type of groups available on the cellulose fibers that are available to react with the chemical additives. The two chemically active groups on the cellulose fibers are hydroxyl and carboxyl groups. The carboxyl groups are generally too few in number and too low in reactivity to be useful. The hydroxyl groups, while more plentiful, are problematic in that a chemical additive that is capable of reacting with a hydroxyl group is also capable of reacting with water. In a typical papermaking process, the amount of process water available for reaction is magnitudes of order larger than the amount of hydroxyl groups available for reaction on the cellulose fibers. As such, the majority of the known chemical additives will react with the process water rather than the hydroxyl groups available on the cellulose fibers. This problem can be reduced as demonstrated in the wet end application of sizing agents, such as ASA (alkyl succinic anhydride) and AKD (alkyl ketene dimer). However, complicated and expensive emulsification must be performed in order to allow addition of these sizing agents to the wet-end of the paper or tissue making process. The costs can become prohibitively high for use in paper and tissue products.

Because of the competition between the paper modifying chemical additives and the strength chemical additives for anionic bonding sites on the cellulose fiber, a better treatment result could be obtained if fewer chemical additives were used to complete the same tasks now performed by the addition of the paper modifying chemical additives and the strength chemical additives. The concurrent use of cationic strength chemical additives and cationic paper modifying chemical additives in the paper or tissue making process, as discussed above, does not give consistent ratios of the chemical additives in the finished paper or tissue products. In addition, these ratios may further depend on the pH, the temperature, and the order of addition of the chemical additives in the paper or tissue making process.

Therefore, there is a need for a means of retaining higher and more consistent levels of paper modifying chemical additives on the paper web via wet end addition. Furthermore, there is a need for retaining more than one chemical functionality to a paper web that mitigates the limitations created by the limited number of bonding sites.

SUMMARY OF THE INVENTION

It has now been discovered that water soluble or water dispersible aldehyde functional polymers routinely used in the paper industry as temporary wet strength chemical additives can be used in conjunction with non-ionic or weakly ionic paper modifying agents to mitigate the limitations as discussed above.

In certain instances, two or more chemical functionalities can be combined into a single molecule, such that the combined molecule imparts a unique product property to the final paper product that heretofore have been imparted through the use of two or more different molecules. Additionally, the process used allows for chemical additives previously not capable of being retained in the wet end of the process to be retained via wet end addition. More specifically, synthetic aldehyde functional polymers, which are commonly used in the paper industry as temporary wet strength resins can be combined into a single molecule with functionalized aldehyde reactive paper modifying agents. The non-functionalized paper modifying agent equivalents are utilized in the paper industry as surface modifiers, release agents, antifoams, softeners, debonders and lubricants. The resulting molecule is a synthetic co-polymer having moieties capable of bonding to the cellulose fibers and paper modifying moieties which can provide several potential benefits, depending on the specific combination employed, including: strength aids that impart softness; softeners that do not reduce strength; wet strength with improved wet/dry strength ratio; surface feel modifiers with reduced linting and sloughing; strength aids with controlled absorbency; retention aids that soften; and, improved retention of the paper modifying agent when added as a wet end chemical additive.

The synthetic aldehyde functional polymers, as described herein, have a portion of their structure derived from the polymerization of ethylenically unsaturated compounds which contain pendant groups that can form hydrogen bonds, ionic bonds or covalent bonds with cellulose molecules in the cellulose fibers, thereby increasing interfiber bonding. At least a portion of said aldehyde functional polymer contains pendant aldehyde functionality. Such pendant aldehyde functionality may be present on the starting polymer or generated in-situ within the papermaking process. Additionally said aldehyde functional polymer may include additional functional groups such as those found in materials such as polyacrylamide, polyvinyl alcohol, polyacrylic acid, polymaleic anhydride, polymaleic acid, polyitaconic acid, cationic polyacrylamides, anionic polyacrylamides, mixtures thereof, and the like. The synthetic aldehyde functional polymers as described herein may be water soluble, organic soluble or soluble in mixtures of water and water miscible organic compounds. Preferably the synthetic aldehyde functional polymers are water-soluble or water dispersible but this is not a necessity of the present invention. Also included within the definition are the salts of the above mentioned acidic polymers. Substances which can be combined with the acidic portion of the polymers to make the salts include the alkali metals such as Potassium and Sodium usually added to the synthetic aldehyde functional polymer in form of their hydroxides.

Hence in one aspect, the present invention resides in a synthetic co-polymer having moieties capable of bonding to the cellulose fibers and containing one or more moieties capable of modifying the paper sheet, said synthetic co-polymer having the following structure:

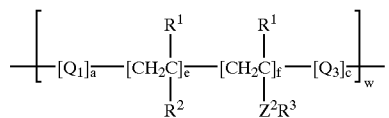

wherein:
  f>0;
  a, c, e≧0;
  w≧1;
  $Q_1$=a monomer unit or a block or graft copolymer prepared from the polymerization of ethylenically unsaturated compounds, at least a portion of which contains a pendant group capable of forming hydrogen bonds with the cellulose fibers. The preferred pendant groups for hydrogen bonding are —CONH$_2$, —COOH, —COO$^-$M$^+$, —OH, and mixtures of these groups. M$^+$ may be any suitable counter ion including Na$^+$, K$^+$, Ca$^{+2}$, and the like;

R$^1$=H and C$_{1-4}$ alkyl;

R$^2$=a hydrocarbon group containing a pendant aldehyde functionality. The hydrocarbon may be aromatic or aliphatic, saturated or unsaturated, linear or branched, and substituted or unsubstituted. R$^2$ may take the form of Z$^4$—R$^{2'}$—Z$^{3'}$ wherein Z$^4$ is any bridging radical whose purpose is to incorporate the aldehyde containing moiety into the polymer backbone; R$^{2'}$ is any hydrocarbon, aromatic or aliphatic, saturated or unsaturated, linear or branched, and substituted or unsubstituted; and, Z$^{3'}$ is the aldehyde functional group —CHO or —CH(OH)$_2$. Examples of suitable R$^2$ groups include but are not limited to: —CONHCHOHCHO and —CONHCHOH(CH$_2$)$_2$CHO;

R$^3$=the aldehyde reactive paper modifying agent residue and may be an aliphatic hydrocarbon, a polysiloxane, an amphiphilic hydrocarbon, or a humectant. When R$^3$ is an aliphatic compound, it will be a C$_6$ or higher aliphatic hydrocarbon, linear or branched, and substituted or unsubstituted;

Z$^2$=the covalently bonded bridging radical formed by the reaction of an aldehyde functionality with a reactivity entity on the aldehyde reactive paper modifying agent; and, Q$_3$=a monomer unit or a block or graft copolymer containing a charge functionality. Such charge functionality is preferably cationic but may be anionic or amphoteric.

In another aspect, the present invention resides in a method of incorporating non-ionic or poorly substantive materials into a paper sheet, such as a tissue sheet, comprising: (a) forming an aqueous suspension of cellulose papermaking fibers; (b) reacting, prior to web formation, a derivatized aldehyde reactive paper modifying agent and an aldehyde functional ionic polymer according to the following reaction:

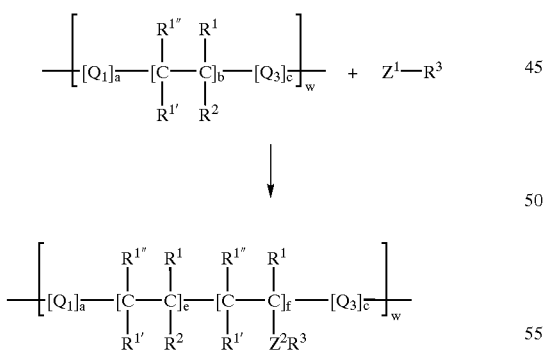

(c) applying the aldehyde functional ionic polymer reacted with derivatized paper modifying agent to the aqueous suspension of the cellulose papermaking fibers; (d) depositing the aqueous suspension of the cellulose papermaking fibers onto a forming fabric to form a web; and (e) dewatering and drying the web to form a paper sheet.

Wherein:
b, c, f>0;
a, e≧0;
e+f=b;
w≧1;

Q$_1$=a monomer unit or a block or graft copolymer prepared from the polymerization of ethylenically unsaturated compounds and containing a pendant group capable of forming hydrogen bonds with the cellulose fibers. The preferred pendant groups for hydrogen bonding are —CONH$_2$, —COOH, —COO$^-$M$^+$, —OH, and mixtures of these groups. M$^+$ may be any suitable counter ion including Na$^+$, K$^+$, Ca$^{+2}$, and the like;

R$^1$, R$^{1'}$, R$^{1''}$=are independently H and C$_{1-4}$ alkyl;

R$^2$=a hydrocarbon group containing a pendant aldehyde functionality. The hydrocarbon may be aromatic or aliphatic, saturated or unsaturated, linear or branched, and substituted or unsubstituted. R$^2$ may take the form of Z$^4$—R$^{2'}$—Z$^{3'}$ wherein Z$^4$ is any bridging radical whose purpose is to incorporate the aldehyde containing moiety into the polymer backbone; R$^{2'}$is any hydrocarbon, aromatic or aliphatic, saturated or unsaturated, linear or branched, and substituted or unsubstituted; and, Z$^{3'}$ is the aldehyde functional group —CHO or —CH(OH)$_2$. Examples of suitable R$^2$ groups include but are not limited to: —CONHCHOHCHO and —CONHCHOH(CH$_2$)$_2$CHO;

R$^3$=the aldehyde reactive paper modifying agent residue and may be an aliphatic hydrocarbon, a polysiloxane, an amphiphilic hydrocarbon, or a humectant. When R$^3$ is an aliphatic compound, it will be a C$_6$ or higher aliphatic hydrocarbon, linear or branched, and substituted or unsubstituted;

Z$^1$=a reactive group capable of reacting with an aldehyde in an aqueous environment to form a covalent bond which is stable in the aqueous environment. The preferred groups include, but are not limited to, primary amines —NH$_2$ and secondary amines —NH—, amides —CONH$_2$, thiols —SH, sulfinic acids —SO$_2$OH, and sulfonamides —SO$_2$NH$_2$;

Z$^2$=the covalently bonded bridging radical formed by the reaction of the aldehyde functionality with Z$^1$ functional moiety; and, Q$_3$=a monomer unit or a block or graft copolymer containing a charge functionality.

Such charge functionality is preferably cationic but may be anionic or amphoteric.

In another aspect, the present invention resides in a paper sheet, such as a tissue sheet, comprising a synthetic co-polymer derived from an aldehyde reactive paper modifying agent and an aldehyde functional ionic polymer, such synthetic co-polymer having hydrogen bonding capability and containing a paper modifying moiety, the synthetic co-polymer having the following structure:

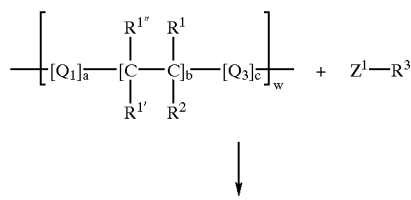

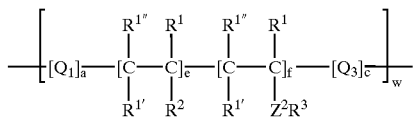

Wherein:
b, c, f>0;
a, e≧0;
e+f=b;
w≧1;

Q₁=a monomer unit or a block or graft copolymer prepared from the polymerization of ethylenically unsaturated compounds, a portion of which contains pendant group capable of forming hydrogen bonds with the cellulose fibers. The preferred pendant groups for hydrogen bonding are —CONH$_2$, —COOH, —COO⁻ M⁺, —OH, and mixtures of these groups. M⁺ may be any suitable counter ion including Na⁺, K⁺, Ca⁺², and the like;

R¹, R¹', R¹''=are independently H and C$_{1-4}$ alkyl;

R²=a hydrocarbon group containing a pendant aldehyde functionality. The hydrocarbon may be aromatic or aliphatic, saturated or unsaturated, linear or branched, and substituted or unsubstituted. R² may take the form of Z⁴—R²'—Z³' wherein Z⁴ is any bridging radical whose purpose is to incorporate the aldehyde containing moiety into the polymer backbone; R²' is any hydrocarbon, aromatic or aliphatic, saturated or unsaturated, linear or branched, and substituted or unsubstituted; and, Z³' is the aldehyde functional group —CHO or —CH(OH)$_2$. Examples of suitable R² groups include but are not limited to: —CONHCHOHCHO and —CONHCHOH(CH$_2$)$_2$CHO;

R³=the aldehyde reactive paper modifying agent residue and may be an aliphatic hydrocarbon, a polysiloxane, an amphiphilic hydrocarbon, or a humectant. When R³ is an aliphatic compound, it will be a C$_6$ or higher aliphatic hydrocarbon, linear or branched, and substituted or unsubstituted;

Z²=the covalently bonded bridging radical formed by the reaction of the aldehyde functionality with Z¹ functional moiety; and, Q₃=a monomer unit or a block or graft copolymer containing a charge functionality.

Such charge functionality is preferably cationic but may be anionic or amphoteric.

There are a variety of ways in which the cationic aldehyde functional polymer and the derivatized aldehyde reactive paper modifying agent may be reacted and applied to the cellulosic fiber substrate. In one such embodiment of the present invention, the cationic aldehyde functional polymer and the derivatized aldehyde reactive paper modifying agent can be mixed directly together in a reaction vessel, allowed to react and then directly added to the pulp slurry. In a second embodiment of the present invention, the cationic aldehyde functional polymer is added to the cellulose papermaking fibers and then the functionalized aldehyde reactive paper modifying agent is added to the papermaking slurry treated with the cationic aldehyde functional polymer. The functionalized paper modifying agent and the cationic aldehyde functional polymer then react on the surface of the cellulose fiber, the aldehyde functional polymer and the synthetic co-polymer being retained on the cellulose fibers via the cationic charge. In a related embodiment, (1) the aldehyde functional polymer is added to the paper slurry of cellulose fibers; (2) a molar excess of the derivatized aldehyde reactive paper modifying agent is added to the paper slurry treated with aldehyde functional polymer; (3) the excess unreacted derivatized aldehyde reactive paper modifying agent is removed via belt press, filtration, or other technique; (4) the pulp is re-dispersed; and, (5) the cellulose fibers are then used to make the paper web via any of the methods known to those skilled in the art.

The amount of the derivatized aldehyde reactive paper modifying agent that can be reacted with the aldehyde functional polymer is not overly critical to the present invention and is limited only by the equivalents of aldehyde and aldehyde reactive moieties present on the molecules. In general, from about 2% to about 100% of the available aldehyde groups will be reacted with the derivatized aldehyde reactive paper modifying agent, more specifically from about 5% to about 100%, and still more specifically from about 10% to about 100%. In some cases it is advantageous to only react a portion of the aldehyde groups with the derivatized aldehyde reactive paper modifying agent, the resulting synthetic co-polymer still maintaining aldehyde functionality and therefore capable of providing wet strength to the paper or tissue web. In the case where pendant amide functionality is present and about 100% of the aldehyde groups have been reacted with the derivatized aldehyde reactive paper modifying agent, the derivatized synthetic co-polymer may be reacted with glyoxal or other suitable dialdehyde to provide a synthetic co-polymer having pendant aldehyde functionality and therefore capable of delivering wet strength to the paper or tissue web. In cases where it is desired to have about 100% of the aldehyde groups reacted with the derivatized aldehyde reactive paper-modifying agent it may be advantageous to use a molar excess of the derivatized paper-modifying agent.

The amount of the synthetic co-polymer added to the cellulose papermaking fibers can be from about 0.02 to about 4 weight percent, on a dry cellulose fiber basis, more specifically from about 0.05 to about 3 weight percent, and still more specifically from about 0.1 to about 2 weight percent. The modified vinyl synthetic co-polymer can be added to the cellulose fibers at any point in the process where the cellulose fibers are suspended in water.

Methods of making paper products that can benefit from the various aspects of the present invention are well known to those skilled in the papermaking art. Such patents include U.S. Pat. No. 5,785,813 issued Jul. 28, 1998 to Smith et al. entitled "Method of Treating a Papermaking Furnish For Making Soft Tissue"; U.S. Pat. No. 5,772,845 issued Jun. 30, 1998 to Farrington, Jr. et al. entitled "Soft Tissue"; U.S. Pat. No. 5,746,887 issued May 5, 1998 to Wendt et al. entitled "Method of Making Soft Tissue Products"; and, U.S. Pat. No. 5,591,306 issued Jan. 7, 1997 to Kaun entitled "Method For Making Soft Tissue Using Cationic Silicones", all of which are hereby incorporated by reference.

DETAILED DESCRIPTION OF THE INVENTION

To further describe the present invention, examples of the synthesis of some of the various chemical species are given below.

Suitable aldehyde functional polymers include the "glyoxylated" polyacrylamides, a class of charged polyacrylamides that has found widespread use in tissue and papermaking. Coscia, et al., U.S. Pat. No. 3,556,932 assigned to the American Cyanamid Company, describes the preparation and properties of glyoxylated polyacrylamides in detail. Examples of commercially available glyoxylated polyacrylamides are Parez 631NC® manufactured and sold by Cytec, Inc. and Hercobond 1366® available from Hercules, Incorporated. These aldehyde functional polymers are ionic or nonionic water-soluble polyvinyl amides, having sufficient glyoxal substituents to be thermosetting. Where a cationic charge is employed, the amount of cationic component in the aldehyde functional polymers should be sufficient to render the aldehyde functional polymer substantive to the cellulose fibers in aqueous suspensions. The amount of cationic charge in these aldehyde functional polymers may vary. It may be less than about 10 mole percent or as high as about 50 mole percent. Indeed, many commercial versions are sold with a charge density of about 5 mole percent. Incorporation of the charge onto the aldehyde functional polymer backbone can be accomplished through any of the methods known in the art. However, one method is to incorporate a cationic vinyl monomer with the acrylamide or other vinyl monomers during the polymerization of the base aldehyde functional polymer. The specific monomer used to introduce the cationic charge onto the polyacrylamide is not overly critical and may be chosen from any such monomers known to be capable of incorporating a cationic charge into a polyacrylamide backbone. Dimethyldiallyl ammonium chloride is an especially preferred monomer for introducing the cationic charge. Where substantivity to the cellulose fibers in aqueous solution is not required, the cationic charge moiety may be absent from the aldehyde functional polymer backbone. The anionic versions of the aldehyde functional polymers may be easily prepared from the appropriate raw materials, these anionic aldehyde functional polymers capable of being deposited on the cellulose fibers with use of alum or various cationic retention aids.

The minimum amount of pendant amide groups that need to be reacted with the glyoxal for the aldehyde functional polymer to be thermosetting is about two mole percent of the total number of available amide groups. It is usually preferred to have an even higher degree of reaction so as to promote greater wet strength development, although above a certain level additional glyoxal provides only minimal wet strength improvement. The optimal ratio of glyoxylated to non-glyoxylated acrylamide groups is estimated to be from about 10 to about 20 mole percent of the total number of amide reactive groups available on the parent aldehyde functional polymer. For the purposes of the present invention, higher levels of glyoxylation may be preferred. The reaction can be easily carried out in dilute solution by stirring the glyoxal with the polyacrylamide base polymer at temperatures of from about 25° C. to about 100° C. at a neutral or slightly alkaline pH. Generally, the reaction is run until a slight increase in viscosity is noted. The majority of the glyoxal reacts at only one of its functionalities yielding the desired aldehyde functional acrylamide. It should also be noted that the reaction is not limited to glyoxal but may be accomplished with any water-soluble dialdehyde including glutaraldehyde.

The molecular weight of the acrylamide base aldehyde functional polymer is not overly critical to the ability to react with glyoxal, and, generally aldehyde functional polymers of molecular weight less than two million are adequately water soluble and dilutable so as not to not severely hinder reaction capability. In practice, lower molecular weight aldehyde functional polymers having a molecular weight less than about 250,000 are generally preferred due to their lower solution viscosity, and the ease at which they can be diluted in water. The molecular weight and the degree of glyoxylation of the aldehyde functional polymer, however, can have an impact on level of wet strength development and ability to disperse readily in water. It might be expected that certain performance characteristics could be tailored by blending aldehyde functional polymers of different molecular weights and substitution levels. For example, U.S. Pat. No. 5,723,022, issued to Dauplaise, et al., discloses the unique performance gained by mixing low and high molecular weight acrylamides having different levels of glyoxylation. Glyoxylated polyacrylamides are generally delivered as dilute aqueous solutions having a solids content of 10% or less. More highly concentrated solutions can be prepared but the risk of gel formation occurs as the solids content is increased. Shelf life is also reduced at elevated temperatures.

A structure for a typical cationic glyoxylated polyacrylamide is shown in FIG. 1. The synthetic co-polymer is retained on the cellulose fiber by means of the cationic quaternary amine group that is attracted to anionic sites on the cellulose fibers. In terms of chemical reactivity, only the amide and aldehyde functionalities are reactive. From about 2 mole % to about 30 mole % of the entire glyoxylated PAM co-polymer exists as the active aldehyde group. The pendant amide groups on the synthetic co-polymer form hydrogen bonds with the cellulose fibers increasing the dry strength of the sheet. The aldehyde group can either cross-link with an amide group in another part of the synthetic co-polymer or react with a hydroxyl group on the cellulose fibers.

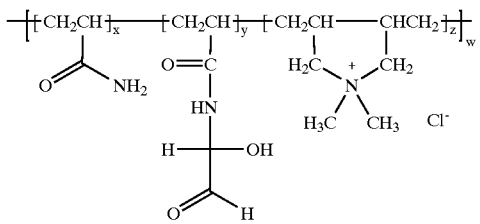

FIG. 1 wherein:

$w \geq 1$; and,
$x, y, z \geq 1$.

If the aldehyde links with the amide, a permanent covalent cross-link is formed which increases permanent wet strength. If the aldehyde forms a covalent hemi-acetal bond to the cellulose fibers, wet strength is also increased. However, this bond is not permanent and will break when immersed in water resulting in temporary instead of permanent wet strength. Hence, the glyoxylated polyacrylamides are normally used to increase dry strength and temporary wet strength, such as is desired for bath tissue.

The glyoxylated polyacrylamides have many beneficial properties. The glyoxylated polyacrylamides increase both the wet and dry strength of the paper. Though slightly acidic conditions are preferred, the glyoxylated polyacrylamides thermoset or "cure" at pHs in the range of from about 4 to about 8 and moderately elevated temperatures that are common to most papermaking systems. Since the glyoxylated polyacrylamide can be cured over a broad pH range including neutral pH, precise control of pH is not required in the papermaking system. The polymers develop the large majority of their wet and dry strength while passing through the drying section of the paper process with sheet temperatures as low as 70° F. to 90° F. being adequate. An additional advantage to the glyoxylated polyacrylamides is that they possess what is referred to as "temporary wet strength". A portion of the wet strength developed within the paper web is lost when soaked in water for a moderate period of time. This feature allows use of these materials in products, such as bath tissue, where water break-up is a required product attribute. In addition, all of the wet strength can be lost rapidly under alkaline conditions. This makes these materials very amenable to broke repulping operations not requiring additional chemical additives or processes which add to overall paper manufacturing costs.

Beyond the reactions with the hydroxyl group on the cellulose fibers and the intramolecular reaction with the pendant amide groups, the reactivity of the aldehyde functional group on glyoxylated PAMs has not been significantly exploited. It is known that repulpable wet strength resins can be prepared from a polycarboxylic acid or ester, a polyamine and a dialdehyde, and an epichlorohydrin. The resulting imine functional groups provide easier repulp characteristics relative to typical azetidinium crosslinks. It is also known to use water soluble polyols in conjunction with glyoxylated PAMs as Yankee dryer adhesive coatings. A known method for imparting synergistic strength to paper is through the use of a aminopolyamide epichlorohydrin resin and a glyoxylated PAM resin in conjunction with or without a high charge density cationic polymer.

The aldehyde group is a common carbonyl group that is rather reactive and used for many chemical syntheses. The aldehyde group can be easily oxidized to a carboxylic acid with a strong acid or reduced to an acetal with alcohols. The aldehydes can react with various forms of nitrogen (amines, cyanohydrins, amides, etc.) to form carbon-nitrogen bonds that are stable even in the presence of water. Amines, because of their non-bonding pair of electrons, are quite nucleophilic. Aldehydes and amines will react rapidly with each other even in aqueous environments. An imine, aminal, or hemi-aminal can be formed from the reaction of an aldehyde and a primary amine. Secondary amines will also react with aliphatic aldehydes but not aromatic aldehydes. This reaction is not limited to nitrogen containing compounds. Functional groups which can react with aldehydes in aqueous systems at near neutral pH to form covalent bonds include primary amines (—$NH_2$), secondary amines (—$NHR_2$), thiols (—SH), amides (—$CONH_2$), sulfonamides (—$OSO_2NH_2$), and sulfinic acids (—$SO_2OH$).

Amines are particularly attractive for reaction with aldehydes due to their ease of preparation and ready availability. As discussed above, aldehydes and amines will react readily with each other, even in aqueous environments. An imine, aminal, or hemi-aminal can be formed from the reaction of an aldehyde and a primary amine (See FIG. 2). Secondary amines will also react with aliphatic aldehydes but not aromatic aldehydes. Secondary amines can not form imines with aldehydes but can form enamines.

FIG. 2

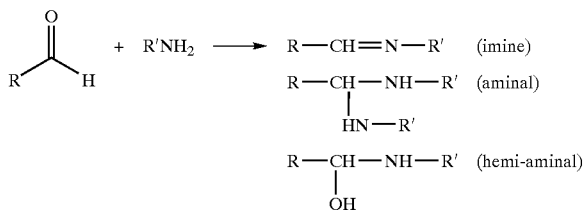

Although both the hydroxyl functional groups and the amine functional groups react with aldehydes, the amine functional groups are more nucleophillic in character. Therefore the amine functional groups will react faster and preferentially to the hydroxyl functional groups on the cellulose fiber and the process water. This affinity exhibited by the amine functional groups can be utilized in the reaction between an aldehyde functional polymer such as a glyoxylated polyacrylamide and the added amine. When the aldehyde functional polymer and amine or other functionalized aldehyde reactive paper modifying agent are mixed, the amine or other aldehyde reactive functional group reacts with the active site of aldehyde functional polymer, namely the aldehyde functional group site. The aldehyde functional group site is effectively destroyed, but the dry strength and product modifying traits provided by the reactants, the PAM aldehyde and the functionalized aldehyde reactive paper modifying agent, are maintained. This allows for the dry strength and aldehyde reactive paper modifying agent to function normally with only a loss of wet strength noted due to the absence of the aldehyde functional group. The degree of wet strength loss will be dependent on the number of aldehyde groups reacted with amine functional compound. It is not necessary that all the aldehyde groups react with the amine or other functionalized aldehyde reactive paper-modifying agent. In fact, there are benefits to only reacting a portion of the said aldehyde groups. The unreacted aldehyde groups are available for bonding to the cellulose fibers or to pendant amide groups thereby increasing the wet or temporary wet strength of the tissue web.

It is known in the art that it is possible to react more than about 10 to about 25 mole percent of the available amide groups in a cationic glyoxylated polyacrylamide with glyoxal. It is also known that there is no advantageous reason to go beyond the about 25 mole percent level as the impact on dry and wet strength with increasing aldehyde content is significantly diminished. However, in the case of reaction with a functional aldehyde reactive paper modifying agent it may be advantageous to have a higher glyoxylation level, reacting the aldehyde reactive paper modifying agent to a point where about 10 to about 20 mole % of the available amide groups of the starting polyacrylamide are aldehyde functional.

Aldehyde Reactive Paper Modifying Moieties

The paper modifying moieties of the present invention can be grouped into three basic categories: 1) aliphatic hydrocarbons; 2) polysiloxanes; and, 3) amphiphilic hydrocarbons including polyhydroxy and polyether derivatives and humectants.

Aliphatic Hydrocarbons

A traditional method of softening tissue is to add a quaternary ammonium compound containing a long chain, $C_{12}$ or higher, aliphatic hydrocarbon to the fibers in the wet end of the process. The long chain aliphatic hydrocarbons reduce fiber to fiber bonding and the resultant loss in tensile strength causes improved softness. It is also known to add these materials topically to a sheet so as to improve surface feel. Typically the aliphatic hydrocarbons are derived from oleic or stearic acid. The functional derivatives of these compounds, including the amines, amides, thiols, and sulfinic acids are well known and commercially available. An example of a commercially available amine functional aldehyde reactive paper modifying agent suited for the present invention are the so called amido amines containing unreacted secondary amine groups. These materials are generally synthesized by the reaction of a compound containing a primary and a secondary amine with an acid or acid derivative of a long chain aliphatic hydrocarbon. The higher reactivity of the primary amine relative to the secondary amine allows for selective amidization of the primary amine. FIG. 3 shows two known examples of such reactions.

FIG. 3

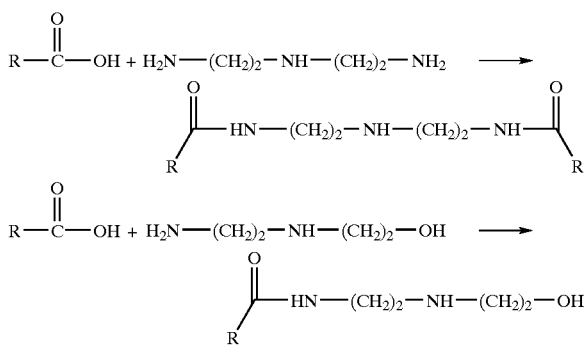

R = C₆ or higher linear or branched, substituted or unsubstituted, saturated or unsaturated hydrocarbon.

Generally these materials will be delivered as aqueous emulsions or as solutions in appropriate polar protic or polar aprotic solvents such as propylene glycol, polyethylene glycol, isopropanol, acetone, and the like. The reaction with the glyoxylated polyacrylamide can be carried out directly by adding the amido amine solution to the aqueous solution of aldehyde functional polymer. One example of suitable commercially available amido amines are those sold under the trade name Reactopaque® 100, 102 and 115 manufactured by Sequa Chemical Company, Chester, S.C., which are sold as aqueous emulsions.

Polysiloxanes

Functionalized polysiloxanes and their aqueous emulsions are well known commercially available materials. The ideal polysiloxane material would be of the following type structure:

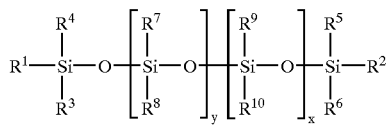

Wherein, x and y are integers>0. One or both of $R^1$ and $R^2$ is a functional group capable of reacting with the aldehyde functionality in an aqueous environment. Suitable $R^1$ and $R^2$ groups include but are not limited to primary amines —$NH_2$ and secondary amines —NH—, amides —$CONH_2$, thiols —SH, sulfinic acids —$SO_2OH$, and sulfonamides —$SO_2NH_2$. The $R^3$ to $R^{10}$ moieties may be independently any organofunctional group including $C_1$ or higher alkyl groups, ethers, polyethers, polyesters, amines, imines, amides, or other functional groups including the alkyl and alkenyl analogues of such groups and including blends of such groups. A particularly useful moiety is a polyether functional group having the generic formula:

—$R^{12}$—($R^{13}$—O)$_a$—($R^{14}$O)$_b$—$R^{15}$, wherein $R^{12}$, $R^{13}$, and $R^{14}$ are independently $C_{1-4}$ alkyl groups, linear or branched; $R^{15}$ can be H or a $C_{1-30}$ alkyl group; and, "a" and "b" are integers of from about 1 to about 100, more specifically from about 5 to about 30.

While the ideal materials may not be readily available or well known in the art, other functional polysiloxanes, most notably amine and thiol derivatives, having the following structure are also well suited for the purposes of the present invention and are well known in the art and readily available:

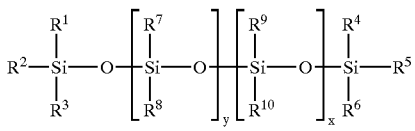

Wherein, x and y are integers>0. The mole ratio of x to (x+y) can be from about 0.005 percent to about 25 percent. The $R^1$-$R^9$ moieties may be independently any organofunctional group including $C_1$ or higher alkyl groups, ethers, polyethers, polyesters, amines, imines, amides, or other functional groups including the alkyl and alkenyl analogues of such groups. A particularly useful moiety is a polyether functional group having the generic formula: —$R^{12}$—($R^{13}$—O)$_a$—($R^{14}$O)$_b$—$R^{15}$, wherein $R^{12}$, $R^{13}$, and $R^{14}$ are independently $C_{1-4}$ alkyl groups, linear or branched; $R^{15}$ can be H or a $C_{1-30}$ alkyl group; and, "a" and "b" are integers of from about 1 to about 100, more specifically from about 5 to about 30. The $R^{10}$ moiety can include any group capable of reacting with aldehyde groups in an aqueous environment to form covalent bonds. The preferred groups include but are not limited to primary amine, secondary amine, thiol, and unsubstituted amides.

The silicone polymers will normally be delivered as aqueous dispersions or emulsions, including microemulsions, stabilized by suitable surfactant systems that may confer a charge to the emulsion micelles. Nonionic, cationic, and anionic systems may be employed as long as the charge of the surfactant used to stabilize the emulsion does not prevent deposition of the synthetic co-polymer onto the surface of the cellulose fibers or interfere with the reaction between the two polymers. When polysiloxanes containing, on the same molecule, multiple groups capable of reacting with the aldehyde functionality are used it is desirable to first apply the aldehyde functional polymer to the cellulosic fibers prior to addition of the aldehyde reactive paper modifying agent thereby avoiding formation of water insoluble gels in solution, such gel formation being deleterious to retention of the synthetic copolymer onto the surface of the cellulose fibers. It is also possible to "break" the emulsion prior to the reaction between the two materials, such mechanism potentially conferring a higher level of activity to the aldehyde reactive groups.

Amphiphilic Hydrocarbons

Plasticization in cellulose structures primarily through use of humectants including the polyethylene oxide and polypropylene oxide polymers as well as their lower molecular weight homologues such as propylene glycol, glycerin, glycerol, and polyethylene glycols of low molecular weights has been described in the literature. The majority of these materials are either low molecular weight polyhydroxy compounds or polyethers and derivatives. They are nonionic, and have no charge. The hydrophilic end often contains a polyether (polyoxyethylene) or one or more hydroxyl groups. They generally include alcohols, alkylphenols, esters, ethers, amine oxides, alkylamines, alkylamides, and polyalkylene oxide block copolymers. It has also been reported that incorporation of such materials with debonding agents can have a synergistic effect on overall product softness in tissue as well as enhanced absorbency. While such materials have been used to enhance softness in tissue products, the materials are introduced to the tissue products by spraying or coating the tissue sheet.

The applications of such treatments include coating a tissue sheet with a carboxylic acid derivative and a water-soluble humectant polyether blend to create a virucidal tissue product. It is also known to spray or coat the sheet with non-cationic low molecular weight polyethers and glycols, to increase softness in combination with another "binder" to counteract the decreased strength of the treated tissue product. It is also known to apply a polyhydroxy compound and an oil to a tissue sheet just after the tissue sheet has been dried on a Yankee or drum dryer but before the creping step is completed to increase the softness of the tissue sheet. A starch or synthetic resin may also be applied as to increase strength to the treated tissue sheet.

The addition of humectant polyether or glycol additives in the wet-end has been limited to use of these materials as co-solvents for various cationic softening compositions. These materials aid in the deposition of the softening agent on the cellulose fibers but do not play a direct role in affecting the properties of the tissue sheet. The absence of charge on these additives prevents the additives from binding or otherwise bonding to the cellulose fibers. In fact, it is well known that the addition of such additives in the wet-end of the paper or tissue making process is discouraged because of the resulting low retention, and therefore poor softening benefits, of these additives.

Low molecular weight polyhydroxy compounds containing functional groups capable of reacting with aldehydes are well known commercially available materials. Examples of suitable materials include but are not limited to 2-(2-aminoethoxy)ethanol, 3-amino-1,2-propanediol, tris (hydroxymethyl) aminomethane, diethanol amine, 1-amino-1-deoxy-D-sorbitol (glucamine), 2-aminoethyl hydrogen sulfate, 2-amino-2-ethyl-1,3-propanediol, 2-amino-1phenyl-1,3-propanediol, 2-amino-1,3-propanediol, 3-amino-1-propanol, ethanolamine, 3-amino-2-hydroxy propionic acid, 1-amino-2,3,4-trihydroxybutane, 4-amino-2-hydroxybutyric acid, aspartic acid, 2-amino-2-methyl-1,3-propanediol, and 2-amino-1,3-propanediol. Low molecular weight thiols include as examples 3-mercapto-1,2-propanediol and mercaptosuccinic acid.

Especially suited to the present invention are the amino and mercapto functional polyethers. Amino functional polyethers, often referred to as polyalkyleneoxy amines, are well known compositions that may be prepared by the reductive amination of polyalkyleneoxy alcohols using hydrogen and ammonia in the presence of a catalyst. This reductive amination of polyols is described in U.S. Pat. Nos. 3,128,311; 3,152,998; 3,236,895; 3,347,926; 3,654,370; 4,014,933; 4,153,581; and, 4,766,245. The molecular weight of the polyalkyleneoxy amine material, when employed is preferably in the range of from about 100 to about 4,000. Additional examples of amine containing polymers having carbon-oxygen backbone linkages and their uses are described in U.S. Pat. Nos. 3,436,359; 3,155,728; and, 4,521,490. Examples of suitable commercially available polyalkyleneoxy amines are materials sold under the trade name Jeffamine® manufactured by Huntsman Chemical Corporation.

Additional derivatives of the polyethers are known including the thiols. They can be obtained via different means including reaction of the corresponding polyoxyalkylene glycol with thionyl chloride to give the corresponding chloro derivative, followed by reaction with thiourea and hydrolysis of the product to give the desired thiol derivative. Examples of the synthesis of thiol derivatives via this process can be found in U.S. Pat. No. 5,143,999. Reactions of alcohols to give thiols is described in a variety of texts such as *Organic Synthesis*, Collective Volume 4, pp. 401–403, 1963. Dithiols and mono thiols can be obtained via the reaction depending on the nature of the starting poly-ether. As with the diamines, the starting polyoxyalkylene derivatives can be a polyethylene, polypropylene, polybutylene, or other appropriate polyether derivative as well as copolymers having mixtures of the various polyether components. Such copolymers can be block or random.

Liquid polysulfide polymers of the general formula:

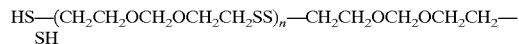

are also known commercially available materials sold by Morton International under the trade name THIOKOL® which have been used in combination with amine curing agents in epoxide resins. These polymeric materials would be expected to react in a like manner with the aldehyde functionality to be incorporated into the polymer backbone.

The molar and weight ratios of the various functional groups on the aldehyde functional polymer will largely depend on the specific application of the material and is not a critical aspect of the present invention. However, the portion of the aldehyde functional polymer $[Q_1]$ capable of forming hydrogen bonds can constitute from about 0 to about 80 mole percent of the total polymer, more specifically from about 5 to about 75 mole percent of the total polymer, and still more specifically from about 10 to about 70 mole percent of the total polymer. The portion of the aldehyde functional polymer containing aldehyde groups can constitute from about 2 to about 80 mole percent of the total polymer, more specifically from about 5 to about 70 mole percent, and still more specifically from about 10 to about 60 mole percent of the total polymer. The charge containing portion $[Q_3]$ of the aldehyde functional polymer may be comprised of monomer units constituting from 0 to about 80 mole percent of the total monomer units in the polymer, more specifically from 0 to about 30 mole percent, and still more specifically from about 2 to about 20 mole percent.

Likewise, the molecular weight of the aldehyde functional polymers of the present invention will largely depend on the specific application of the material and is not overly critical to the present invention. The weight average molecular weight range can be from about 500 to about 5,000,000, more specifically from about 1,000 to about 2,000,000, and still more specifically from about 2,000 to about 1,000,000. Where these aldehyde functional polymers are added for dry strength, it is important that the molecular weight of the aldehyde functional polymer be low enough so as to not bridge between particles and cause flocculation, and yet high enough so as to retard migration of the aldehyde functional polymer into the pores of the cellulose fibers. These materials can have weight average molecular weights in the range of from about 2,000 to about 2,000,000, more specifically from about 5,000 to about 1,500,000, and still more specifically from about 10,000 to about 1,000,000.

Likewise, the molecular weight of the product synthetic co-polymer will depend upon the molecular weight of the aldehyde reactive paper modifying agent, the degree to which the aldehyde groups are reacted and the molecular weight of the starting aldehyde functional polymer. The weight average molecular weight range can be from about 750 to about 6,000,000, more specifically from about 2,000 to about 4,000,000, and still more specifically from about 5,000 to about 3,000,000. Where these synthetic co-polymers are added for dry strength, it is important that the molecular weight of the synthetic co-polymer be low enough so as to not bridge between particles and cause flocculation, and yet high enough so as to retard migration of the synthetic co-polymer into the pores of the cellulose fibers. These materials can have weight average molecular weights in the range of from about 3,000 to about 3,000,000, more specifically from about 5,000 to about 2,000,000 and still more specifically from about 20,000 to about 1,500,000.

The amount of derivatized aldehyde reactive paper modifying agent that can be reacted with the aldehyde functional polymer is not overly critical to the present invention and is limited only by the equivalents of aldehyde and amine groups. In general, from about 2 to about 100% of the available aldehyde groups will be reacted with the derivatized paper modifying agent, more specifically from about 5% to about 100%, and still more specifically from about 10% to about 100%. In some cases it is advantageous to only react a portion of the aldehyde groups with the derivatized aldehyde reactive paper modifying agent, the resulting synthetic co-polymer still maintaining aldehyde functionality and therefore capable of providing wet strength to the paper or tissue web. In the case where pendant amide functionality is present and 100% of the aldehyde groups have been reacted with the derivatized aldehyde reactive paper modifying agent, the derivatized aldehyde functional polymer may be reacted with glyoxal or other suitable dialdehyde to give a synthetic co-polymer having pendant aldehyde functionality and therefore capable of delivering wet strength to the paper or tissue web. In cases where it is desired to have 100% of the aldehyde groups reacted with the derivatized aldehyde reactive paper modifying agent it may be advantageous to use a molar excess of the derivatized aldehyde reactive paper modifying agent.

The pH of the reaction mixture can be anticipated to have an impact on the extent and rate of reaction. Addition of hydrogen ion to the carbonyl group is known to facilitate nucleophilic addition to carbonyl compounds. On the other hand, if amines are used as the aldehyde reactive species, the nucleophilicity of the amine will be reduced by protonation of the basic amine group. Hence, it is desirable to select an adequate pH condition to promote the protonation of the carbonyl yet minimizing protonation of the basic amine. A pH of from about 3 to about 11 is adequate for the reaction. In another embodiment, a pH of from about 4 to about 10 is adequate for the reaction. In another embodiment, a pH of from about 5 to about 9 is adequate for the reaction. Heat may also be applied to help drive the reaction, however, where glyoxylated polyacrylamides are used it is important to choose a temperature sufficiently low so as to minimize reaction of the pendant amide groups with the aldehyde groups. Extensive crosslinking can lead to gel formation and insolubility reducing the effectiveness of the polymer.

Where water solubility or dispersivity is desired it is preferable to have lower molecular weight as well as a minimal level of intramolecular crosslinking between aldehyde and the pendant amide prior to adding the aldehyde reactive paper modifying agent. Very high molecular weights or high levels of crosslinking reduce the water solubility of the synthetic co-polymer and can lead to precipitation of the product from an aqueous solution.

Analytical Testing

Basis Weight Determination (Handsheets)

The basis weight and bone dry basis weight of the specimens was determined using a modified TAPPI T402 procedure. As is basis weight samples are conditioned at 23° C.±1° C. and 50%±2% relative humidity for a minimum of 4 hours. After conditioning, the handsheet specimen stack is cut to 7.5"×7.5" sample size. The number of handsheets in the stack (represented as X) may vary but should contain a minimum of 5 handsheets. The specimen stack is then weighed to the nearest 0.001 gram on a tared analytical balance and the stack weight (represented as W) recorded. The basis weight in grams per square meter is then calculated using the following equation:

Actual Basis Weight $(g/m^2) = (W/X) \times 27.56$

The bone-dry basis weight is obtained by weighing a sample can and sample can lid the nearest 0.001 grams (this weight is represented as A). The sample stack is placed into the can and left uncovered. The uncovered sample can and stack along with sample can lid is placed in a 105° C.±2° C. oven for a period of 1 hour±5 minutes for sample stacks weighing less than 10 grams and at least 8 hours for sample stacks weighing 10 grams or greater. After the specified oven time, the sample can lid is placed on the sample can and the can removed from the oven. The sample cans are allowed to cool to approximately ambient temperature but no more than 10 minutes. The sample can, sample can lid, and specimen are then weighed to the nearest 0.001 gram (this weight is represented as C). The bone-dry basis weight in $g/m^2$ is calculated using the following equation:

Bone Dry $BW (g/m^2) = [(C-A)/X] \times 27.56$

Dry Tensile Strength

The tensile strength test results are expressed in terms of breaking length. The breaking length is defined as length of specimen that will break under its own weight when suspended and has units of km. It is calculated from the Peak Load tensile using the following equation:

Breaking length (km) = [Peak Load in g/in × 0.039937] ÷ Actual basis wt. in $g/m^2$ The peak load tensile is defined as the maximum load, in grams, achieved before the specimen fails. It is expressed as grams-force per inch of sample width. All testing is done under laboratory conditions of 23.0+/−1.0° C., 50.0+/−2.0% relative humidity, and after the sheet has equilibrated to the testing conditions for a period of not less than four hours. The testing is done on a tensile testing machine maintaining a constant rate of elongation, and the width of each specimen tested was 1 inch. The specimen were cut into strips having a 1±0.4 inch width using a precision cutter. The "jaw span" or the distance between the jaws, sometimes referred to as gauge length, is 5.0 inches. The crosshead speed is 0.5 inches per minute (12.5 mm/min.) A load cell or full scale load is chosen so that all peak load results fall between about 20 and about 80 percent of the full scale load. Suitable tensile testing machines include those such as the Sintech QAD IMAP integrated testing system. This data system records at least 20 load and elongation points per second.

Wet Tensile Strength

For wet tensile peak load and breaking length determination distilled water is poured into a container to a depth of approximately ½ to ¾ of an inch. An open loop was formed by holding each end of a test specimen and carefully lowering the specimen until the lowermost curve of the loop touches the surface of the water without allowing the inner side of the loop to come together. The lowermost point of the curve on the handsheet is contacted with the surface of the distilled water in such a way that the wetted area on the inside of the loop extends at least 1 inch and not more than 1.5 inches lengthwise on the specimen and is uniform across the width of the specimen. Care was taken to not wet each specimen more than once or allow the opposite sides of the loop to touch each other or the sides of the container. Excess water was removed from the test specimen by lightly touching the wetted area to a blotter. Each specimen was blotted only once. Each specimen is then immediately inserted into the tensile tester so that the jaws are clamped to the dry area of the test specimen with the wet area approximately midway between the span. The test specimen are tested under the same instrument conditions and using same calculations as for Dry Tensile Strength measurements.

Polydimethylsiloxane Determination

Polydimethyl siloxane content on cellulose fiber substrates was determined using the following procedure. A sample containing dimethyl siloxane is placed in a head-space vial, boron trifluoride reagent is added, and the vial sealed. After reacting for fifteen minutes at 100° C. the resulting Diflourodimethyl siloxane in the headspace of the vial is measured by gas chromatography with an FID detector.

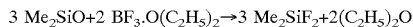

$$3\ Me_2SiO + 2\ BF_3 \cdot O(C_2H_5)_2 \rightarrow 3\ Me_2SiF_2 + 2(C_2H_5)_2O$$

The method described herein was developed using a Hewlett-Packard Model 5890 Gas Chromatograph with an FID and a Hewlett-Packard 7964 autosampler. An equivalent gas chromatography system may be substituted.

The instrument was controlled by, and the data collected using, Perkin-Elmer Nelson Turbochrom software (version 4.1). An equivalent software program may be substituted. A J&W Scientific GSQ (30 m×0.53 mm i.d.) column with film thickness 0.25 μm, Cat. #115-3432 was used. An equivalent column may be substituted.

The gas chromatograph was equipped with a Hewlett-Packard headspace autosampler, HP-7964 and set up at the following conditions:

Bath Temperature: 100° C.   Loop Temperature: 110° C.
Transfer Line Temperature: 120° C.   GC Cycle Time: 25 minutes
Vial Equilibrium Time: 15 minutes   Pressurize Time: 0.2 minutes
Loop Fill Time: 0.2 minutes   Loop Equil. Time: 0.05 minutes
Inject Time: 1.0 minute   Vial Shake: 1 (Low)

The Gas Chromatograph was set to the following instrument conditions:

Carrier gas: Helium

Flow rate: 16.0 mL through column and 14 mL make-up at the detector.

Injector Temperature: 150° C.

Detector Temperature: 220° C.

Chromatography Conditions: 50° C. for 4 minutes with a ramp of 10° C./minute to

150° C. Hold at final temperature for 5 minutes.

Retention Time: 7.0 min. for DFDMS

Preparation of Stock Solution

A stock solution containing approximately 5000 μg/ml polydimethyl siloxane was prepared in the following manner. Approximately 1.25 grams of the Polydimethylsiloxane emulsion is weighed to the nearest 0.1 mg into a 250-ml volumetric flask. The actual weight (represented as X) is recorded. Distilled water is added and the flask swirled to dissolve/disperse the emulsion. When dissolved/dispersed the solution is diluted to volume with water and mixed. The ppm of the polysiloxane emulsion (represented as Y) is calculated from the following equation:

$$\text{PPM polysiloxane emulsion } Y = X/0.250$$

Preparation of Calibration Standards

The Calibration Standards are made to bracket the target concentration by adding 0 (blank), 50, 100, 250, and 500 μL of the Stock Solution (the volume in uL $V_c$ is recorded) to successive 20 mL headspace vials containing 0.1±0.001 grams of an untreated control tissue. The solvent is evaporated by placing the headspace vials in an oven at a temperature ranging between about 60° C. to about 70° C. for 15 minutes. The μg of emulsion (represented as Z) for each calibration standard is calculated from the following equation:

$$Z = V_c * Y/1000$$

The calibration standards are then analyzed according to the following procedure:

Analytical Procedure 0.100±0.001 g of tissue sample is weighed to the nearest 0.1 mg into a 20-ml headspace vial. The sample weight (represented as $W_s$) in mg is recorded. The amount of tissue taken for the standards and samples must be the same.

100 μL of $BF_3$ reagent is added to each of the samples and calibration standards. Each vial is sealed immediately after adding the $BF_3$ reagent.

The sealed vials are placed in the headspace autosampler and analyzed using the conditions described previously, injecting 1 mL of the headspace gas from each sample and standard.

Calculations

A calibration curve of μg emulsion versus analyte peak area is prepared.

The analyte peak area of the sample is then compared to the calibration curve and amount of polydimethylsiloxane emulsion (represented as (A)) in μg on the tissue determined.

The amount of polydimethylsiloxane emulsion (represented as (C)) in percent by weight on the tissue sample is computed using the following equation:

$$(C) = (A)/(W_s * 10^4)$$

The amount of the polydimethylsiloxane (represented as (D)) in percent by weight on the tissue sample is computed using the following equation and the weight % polysiloxane (represented as (F)) in the emulsion:

$$(D) = (C) * (F)/100$$

EXAMPLE 1

Preparation of Glyoxylated PAM/2-(2-aminoethoxy)ethanol 50 mL of a 6.5 wt. % solution of a commercially available cationic glyoxylated polyacrylamide, Parez 631N®, and 200 ml of distilled water was charged to a 1-liter round bottom flask equipped with a mechanical stirrer and a 500 ml addition funnel. 0.57 grams of 2-(2-aminoethoxy) ethanol was weighed into a 400 cc beaker and 250 ml of distilled water added. The amine functional polyhydroxy compound was then added dropwise to the stirred glyoxylated polyacrylamide solution over 42 minutes at ambient temperature to the glyoxylated PAM. The solution turned very cloudy and a heavy precipitate was formed in the reaction vessel indicating that the reaction product was insoluble in water.

EXAMPLE 2

Preparation of Glyoxylated PAM/3-amino-1,2-propane diol copolymer 50 mL of a 6.5 wt. % solution of a commercially available cationic glyoxylated polyacrylamide, Parez 631NC®, and 200 ml of distilled water was charged to a 1-liter round bottom flask equipped with a mechanical stirrer and a 500 ml addition funnel. 0.42 grams of 3-amino-1,2-propane diol (97%, Aldrich Chemical Co.) was weighed into a 400 cc beaker and 250 ml of distilled water added. The amine functional polyhydroxy compound was then added dropwise to the stirred glyoxylated polyacrylamide solution over 60 minutes at ambient temperature. After addition was complete the slightly cloudy solution was transferred to a 500-ml volumetric flask and diluted to the mark with distilled water.

EXAMPLE 3

Preparation of Glyoxylated PAM/Tris(hydroxymethyl) aminomethane

The same procedure as that of Example 1 was followed except that 0.66 grams of tris(hydroxymethyl) aminomethane was used as the amine compound and was added over a period of 57 minutes to the glyoxylated PAM.

EXAMPLE 4
Preparation of Glyoxylated PAM/Diethanol Amine Copolymer

Example 4 illustrates the use of a polyhydroxy secondary amine. The same procedure as that of Example 1 was followed except that 0.56 grams of diethanol amine was used as the amine compound and was added over a period of 50 minutes to the glyoxylated PAM.

Examples 5–7 illustrate the use of amino functional polyethers:

EXAMPLE 5

The same procedure as that of Example 1 was followed except that 3.28 grams of a commercially available amino functional polyether, Jeffamine M-600 from Hunstman Chemical was used as the amine. The amine was added to the stirred solution of glyoxylated polyacrylamide over a 90 minute period of time. A slightly hazy solution was obtained.

EXAMPLE 6

The same procedure as that of Example 5 was followed except that 5.48 grams of a commercially available amino functional polyether, Jeffamine M-1003 also named XTJ-506, molecular weight around 1,000 from Huntsman Chemical was used as the amine. The amine was added to the stirred solution of glyoxylated polyacrylamide over a 61 minute period of time. A slightly hazy solution was obtained.

EXAMPLE 7

The same procedure as that of Example 5 was followed except that 11.34 grams of a commercially available amino functional polyether, Jeffamine M-2070, from Hunstman Chemical was used as the amine. The amine was added to the stirred solution of glyoxylated polyacrylamide over a 145 minute period of time. A hazy solution was obtained.

Examples 8–16 illustrate preparation of handsheets with the chemicals of Examples 1–7. The method for handsheet preparation was as follows:

For each of the Examples 8–16, about 15.78 g (15 grams o.d.b.) of Northern Softwood Kraft and 37.03 g (35 grams o.d.b.) of Eucalyptus were dispersed for 5 minutes in 2 liters of tap water using a British Pulp Disintegrator. The pulp slurry was then diluted to 8-liters with tap water. The aldehyde/functional paper modifying agent co-polymer was then added to the pulp slurry and mixed for 15 minutes before being made into handsheets. The amount of chemical needed was calculated by the amount of glyoxylated PAM. For the 5, 10, and 15 pounds per ton mixes, about 19.23 mL, 38.46 mL, or 57.69 mL (respectively) of PAM/amine was to be added to the paper pulp. The density of the polymer solutions is assumed to be 1 g/mL, the chemical was weighed out to the nearest 0.0001 gram into a tared 100 mL beaker. For each code, one trial of 5, 10, and 15 pounds of PAM per ton of paper was completed. A control group consisting of Parez 631NC® (no amine) was also created in the 5, 10, and 15 pounds quantities.

Table 1 and 2 give dry tensile strength and wet tensile strength data for the handsheets made with the various co-polymers and also shows the change in dry tensile strength relative to the control sample made with Parez® 631NC. With the exception of Example 9 all handsheets show equivalent to slightly higher dry tensile strength than the control made with Parez®631NC and significantly higher dry tensile strength than Example 16 made with no chemical. Yet, with the exception of Example 11 all show a marked decrease in wet strength relative to the glyoxylated polyacrylamide control. This would be an expected result were the aldehyde group to have reacted with the amine. Destruction of the glyoxal group leads to a loss in wet strength, yet the pendant amide groups are available for increasing dry strength. The behavior seen in Example 2 can be explained due to the precipitation of the co-polymer. Precipitation of the co-polymer would lead to poor retention and a behavior similar to the control with no chemical should be noted.

TABLE 1

| Example | Polymer from Example # | Dry Tensile Break Length Km | | | Change in dry tensile relative to Glyoxylated PAM control (%) | | |
|---|---|---|---|---|---|---|---|
| | | 5# | 10# | 15# | 5# | 10# | 15# |
| 8 | (Parez ®631NC) | 2.4 | 2.8 | 3.3 | — | — | — |
| 9 | 1 | 2.2 | 2.3 | 2.5 | −7.4 | −18.9 | −24.8 |
| 10 | 2 | 2.4 | 2.8 | 3.2 | −1.0 | −0.9 | −2.7 |
| 11 | 3 | 2.6 | 3.1 | 3.4 | 8.6 | 10.8 | 2.8 |
| 12 | 4 | 2.6 | 3.3 | 3.2 | 8.6 | 17.7 | −3.5 |
| 13 | 5 | 2.6 | 3.0 | 3.3 | 7.4 | 4.2 | −1.2 |
| 14 | 6 | 2.7 | 3.1 | 3.4 | 10.3 | 8.4 | 0.8 |
| 15 | 7 | 2.5 | 2.7 | 3.1 | 2.5 | −5.6 | −7.9 |
| 16 | (none) | 2.2* | — | — | −9.2 | −26.4 | −46.8 |

*No chemical additives present.

TABLE 2

| Example | Polymer from Example # | Wet Tensile Break Length Km | | | Change in wet tensile relative to Glyoxylated PAM control (%) | | |
|---|---|---|---|---|---|---|---|
| | | 5# | 10# | 15# | 5# | 10# | 15# |
| 8 | (Parez 631NC ®) | 0.37 | 0.45 | 0.59 | — | — | — |
| 9 | 1 | 0.13 | 0.15 | 0.17 | −65.9 | −65.5 | −70.7 |
| 10 | 2 | 0.20 | 0.28 | 0.38 | −47.3 | −36.3 | −35.1 |
| 11 | 3 | 0.31 | 0.48 | 0.59 | −15.1 | 6.5 | −0.3 |
| 12 | 4 | 0.26 | 0.42 | 0.47 | −29.5 | −6.3 | −19.8 |
| 13 | 5 | 0.23 | 0.33 | 0.43 | −38.9 | −26.2 | −26.6 |
| 14 | 6 | 0.24 | 0.38 | 0.51 | −35.9 | −15.0 | −12.9 |
| 15 | 7 | 0.15 | 0.29 | 0.38 | −60.3 | −34.5 | −35.4 |
| 16 | (none) | 0.13* | — | — | −65.7 | −71.5 | −78.4 |

*No chemical additives present.

An anticipated benefit of incorporating humectant materials into a paper sheet such as a sheet would be decreased stiffness. A key element to softness in tissue products is the stiffness of the sheet. An inverse correlation exists between softness and stiffness. In the same manner a direct linear correlation exists between tensile strength of a sheet and its bending stiffness. For a tissue product the desired trait is to have a low stiffness at a high tensile strength, in this way making for a strong, soft tissue product. Kawabata bending stiffness provides a good analytical tool for measuring the stiffness of a paper sheet.

Pure Bending (KES FB-2) is the part of the Kawabata Evaluation System that measures the relationship between the bending momentum and the curvature and it automatically records a relationship on an X-Y recorder. It gives a measure of the stiffness of the sample, the higher the bending value the stiffer the sample. A detailed description of the complete Kawabata measurement system can be found in Kawabata, S., "The Standardization and Analysis of Hand Evaluation", The Textile Machinery Society of Japan, July 1980, 2nd Ed., Osaka, Japan.

The sample specimen is mounted through a moving front chuck and then through a fixed rear chuck spaced 1 cm apart.

The sample is installed so that the test direction is at right angles to chucks. Where MD and CD directions are tested the MD direction is tested first. The sample must be straight, flat and even, with no puckers or air pockets taking care not to allow the sample to protrude through the back chuck. The instrument then accurately bends the sample in an arc of constant curvature of approximately 150 degrees between the curvatures K=−1.0 and 1.0 $(cm^{-1})$ at a constant rate of curvature change of 0.50 $(cm^{-1})$/sec. The fixed end of the specimen is on a rod which is also supported by wires at both ends. The bending moment induced by the bending deformation is detected by a torque meter and the curvature is detected by measuring the rotation angle of the crank. A torque sensitivity of 2×1 and a full scale momentum of 20 gf/cm is used for tissue and handsheet analysis. Through a system of electrical signal circuits, the bending moment and curvature are sent to a x-y recorder and plotted. The slope of the curve of bending moment vs. curvature is the bending stiffness (represented as B) per unit width given in units of gf-cm/cm. Where gf-cm is grams force centimeters, with one Newton-meter of force being equivalent to $9.807 \times 10^{-5}$ gf-cm.

A minimum of 5 replicates is done for each sample. If directional side matters, five samples are tested in the machine direction (MD) WARP and five samples are tested in the cross direction (CD) WEFT and the bending stiffness reported is the average of the bending stiffness in the MD and CD direction. If direction does not matter five samples are run under WARP conditions only.

The bending stiffness is then calculated from the following equation:

$$B = \frac{\text{Forward Slope} + \text{Backward Slope}}{2} \times Y\text{-axis centimeter value} \times \text{Size factor}$$

The standard sample width is 20 cm, however, any sample width may be used provided a size factor is used to convert results to a 20 cm value. For the handsheet Examples 8–16 given in Table 2, a sample width of 18.0 cm was used with a size factor of 1.1.

Size Factor=20÷sample width in centimeters

Corrected bending stiffness=Measured bending stiffness× Size Factor.

The pure bending stiffness results obtained from the handsheets of Examples 8–16 are shown in Table 3. Graphically the results are shown in FIG. 4. In Table 3, the slope is defined as the difference between the bending stiffness of the sample and the bending stiffness of the untreated cellulosic sheet divided by the difference between the breaking length of the sample sheet and the breaking length of the untreated cell ulosic sheet. A lower slope is preferred and indicates a less stiff sheet at a given tensile strength. With the exception of M-2070 (Example 15), all handsheets made with the polymers of the present invention exhibit lower stiffness at a given tensile strength than when only an unmodified glyoxylated polyacrylamide is used.

TABLE 3

| Handsheets from Example | Polymer from Example | Breaking Length (km) | Pure Bending Stiffness Gf-cm/cm | Slope gf-cm/cm · km |
|---|---|---|---|---|
| 8 | Glyoxylated PAM | 3.32 | 1.34 | 0.28 |
| 9 | 1 | 2.50 | 1.07 | 0.13 |
| 10 | 2 | 3.23 | 1.24 | 0.20 |
| 11 | 3 | 3.42 | 1.31 | 0.23 |
| 12 | 4 | 3.21 | 1.22 | 0.19 |
| 13 | 5 | 3.28 | 1.29 | 0.24 |
| 14 | 6 | 3.35 | 1.18 | 0.13 |
| 15 | 7 | 3.06 | 1.30 | 0.31 |
| 16 | (none) | 2.20 | 1.03 | n/a |

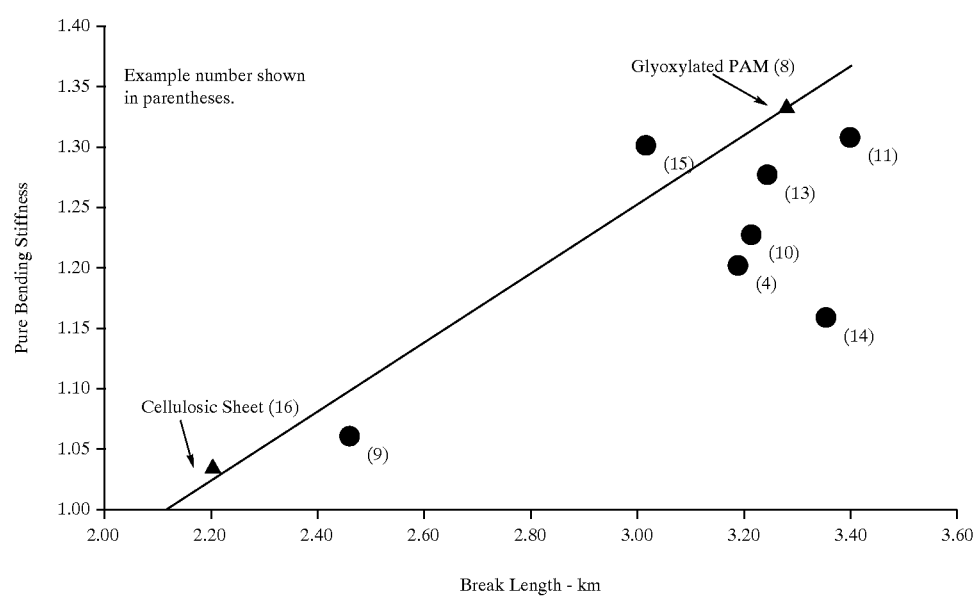

Examples 17–20 demonstrate the use of a glyoxylated polyacrylamide in conjunction with an amino functional polysiloxane to enhance the retention of the polysiloxane material. It should be noted from these examples that even small levels of the glyoxylated polymer can significantly enhance the retention of the aldehyde reactive paper-modifying agent. In this case the amino functional polysiloxane was delivered in the form of a cationic microemulsion.

EXAMPLE 17

(Control)

A single ply, two-layered, uncreped through air dried tissue basesheet was made generally in accordance with U.S. Pat. No. 5,607,551 issued Mar. 4, 1997 to Farrington et al. entitled "Soft Tissue", which is herein incorporated by reference. More specifically, 65 pounds (oven dry basis) of eucalyptus hardwood Kraft fiber were dispersed in a pulper for 25 minutes at a consistency of 3% before being transferred to a machine chest and diluted to a consistency of 1%. 40 pounds (oven dry basis) of northern softwood kraft fiber were dispersed in a pulper for 25 minutes at a consistency of 3 percent before being transferred to a second machine chest and diluted to 1% consistency. To the machine chest containing the northern softwood kraft fiber was added 1,100 grams of a 6.5% aqueous solution (71.5 grams dry basis, 4 kg /MT of softwood fiber) of a commercially available cationic glyoxylated polyacrylamide dry strength resin, Parez® 631-NC. 985 grams of DC-2-1173, a cationic microemulsion of an amino functional polysiloxane available from Dow Corning, containing 22.5% by weight of the amino functional polysiloxane was added to the Eucalyptus slurry. This represents a polysiloxane content of 7.5 kg/MT of dry Eucalyptus or 0.48% of total weight of the fiber sheet. Prior to forming each stock was further diluted to approximately 0.1 percent consistency and transferred to a 2-layer headbox in such a manner as to provide a layered sheet comprising 65% Eucalyptus and 35% NSWK. The formed web was non-compressively dewatered and rush transferred to a transfer fabric traveling at a speed about 25 percent slower than the forming fabric. The web was then transferred to a throughdrying fabric, dried and calendered. The total basis weight of the resulting sheet was 18.5 pounds per 2880 ft$^2$. The amount of polysiloxane in the total basesheet was found to be 0.18% corresponding to a retention of 38%.

EXAMPLE 18

A single ply, two-layered, uncreped throughdried tissue basesheet was made generally in accordance with U.S. Pat. No. 5,607,551 issued Mar. 4, 1997 to Farrington et al. entitled "Soft Tissue", which is herein incorporated by reference. More specifically, 65 pounds (oven dry basis) of eucalyptus hardwood Kraft fiber were dispersed in a pulper for 25 minutes at a consistency of 3% before being transferred to a machine chest and diluted to a consistency of 1%. 40 pounds (oven dry basis) of northern softwood kraft fiber were dispersed in a pulper for 25 minutes at a consistency of 3 percent before being transferred to a second machine chest and diluted to 1% consistency. To the machine chest containing the northern softwood kraft fiber was added 1,100 grams of a 6.5% aqueous solution (71.5 grams dry basis, 4 kg/MT of softwood fiber) of a commercially available cationic glyoxylated polyacrylamide dry strength resin, Parez® 631-NC. To the machine chest containing the Eucalyptus hardwood kraft fiber was added 454 grams of a 6.5% aqueous solution (29.5 grams dry basis, 1 kg/MT of hardwood fiber) of a commercially available cationic glyoxylated polyacrylamide dry strength resin, Parez® 631-NC. After addition of the glyoxylated polyacrylamide, 985 grams of DC-2-1173, a cationic microemulsion of an amino functional polysiloxane available from Dow Corning, containing 22.5% by weight of the amino functional polysiloxane was added to the Eucalyptus slurry. This represents a polysiloxane content of 7.5 kg/MT of dry Eucalyptus or 0.48% of total weight of the fiber sheet. Prior to forming each stock was further diluted to approximately 0.1 percent consistency and transferred to a 2-layer headbox in such a manner as to provide a layered sheet comprising 65% Eucalyptus and 35% NSWK. The formed web was non-compressively dewatered and rush transferred to a transfer fabric traveling at a speed about 25 percent slower than the forming fabric. The web was then transferred to a throughdrying fabric, dried and calendered. The total basis weight of the resulting sheet was 18.5 pounds per 2880 ft$^2$. The amount of polysiloxane in the total basesheet was found to be 0.30% corresponding to a retention of 62%.

EXAMPLE 19

(Control)

A single ply, two-layered, uncreped throughdried tissue basesheet was made generally in accordance with U.S. Pat. No. 5,607,551 issued Mar. 4, 1997 to Farrington et al. entitled "Soft Tissue", which is herein incorporated by reference. More specifically, 65 pounds (oven dry basis) of eucalyptus hardwood Kraft fiber was dispersed in a pulper for 25 minutes at a consistency of 3% before being transferred to a machine chest and diluted to a consistency of 1%. 40 pounds (oven dry basis) of northern softwood kraft fiber were dispersed in a pulper for 25 minutes at a consistency of 3 percent before being transferred to a second machine chest and diluted to 1% consistency. To the machine chest containing the northern softwood kraft fiber was added 1,100 grams of a 6.5% aqueous solution (71.5 grams dry basis, 4 kg/MT of softwood fiber) of a commercially available cationic glyoxylated polyacrylamide dry strength resin, Parez® 631-NC. 1970 grams of DC-2-1173, a cationic microemulsion of an amino functional polysiloxane available from Dow Corning, containing 22.5% by weight of the amino functional polysiloxane was added to the Eucalyptus slurry. This represents a polysiloxane content of 15 kg/MT of dry Eucalyptus or 0.96% of total weight of the fiber sheet. Prior to forming each stock was further diluted to approximately 0.1 percent consistency and transferred to a 2-layer headbox in such a manner as to provide a layered sheet comprising 65% Eucalyptus and 35% NSWK. The formed web was non-compressively dewatered and rush transferred to a transfer fabric traveling at a speed about 25 percent slower than the forming fabric. The web was then transferred to a throughdrying fabric, dried and calendered. The total basis weight of the resulting sheet was 18.5 pounds per 2880 ft$^2$. The amount of polysiloxane in the total basesheet was found to be 0.16% corresponding to a retention of 16%.

EXAMPLE 20

A single ply, two-layered, uncreped throughdried tissue basesheet was made generally in accordance with U.S. Pat. No. 5,607,551 issued Mar. 4, 1997 to Farrington et al. entitled "Soft Tissue", which is herein incorporated by reference. More specifically, 65 pounds (oven dry basis) of eucalyptus hardwood Kraft fiber was dispersed in a pulper for 25 minutes at a consistency of 3% before being transferred to a machine chest and diluted to a consistency of 1%. 40 pounds (oven dry basis) of northern softwood kraft fiber were dispersed in a pulper for 25 minutes at a consistency of 3 percent before being transferred to a second machine chest and diluted to 1% consistency. To the machine chest containing the northern softwood kraft fiber was added 1,100 grams of a 6.5% aqueous solution (71.5 grams dry basis, 4 kg/MT of softwood fiber) of a commercially available cationic glyoxylated polyacrylamide dry strength resin, Parez® 631-NC. To the machine chest containing the Eucalyptus hardwood kraft fiber was added 454 grams of a 6.5% aqueous solution (29.5 grams dry basis, 1 kg/MT of hardwood fiber) of a commercially available cationic glyoxylated polyacrylamide dry strength resin, Parez® 631-NC. After addition of the glyoxylated polyacrylamide, 1970 grams of DC-2-1173, a cationic microemulsion of an amino functional polysiloxane available from Dow Corning, containing 22.5% by weight of the amino functional polysiloxane was added to the Eucalyptus slurry. This represents a polysiloxane content of 7.5 kg/MT of dry Eucalyptus or 0.96% of total weight of the fiber sheet. Prior to forming each stock was further diluted to approximately 0.1 percent consistency and transferred to a 2-layer headbox in such a manner as to provide a layered sheet comprising 65% Eucalyptus and 35% NSWK. The formed web was non-compressively dewatered and rush transferred to a transfer fabric traveling at a speed about 25 percent slower than the forming fabric. The web was then transferred to a through-drying fabric, dried and calendered. The total basis weight of the resulting sheet was 18.5 pounds per 2880 ft$^2$. The amount of polysiloxane in the total basesheet was found to be 0.39% corresponding to a retention of 40%.

TABLE 4

| Example | Polysiloxane add-on level % of total dry fiber weight | Glyoxylated PAM - % of total hardwood fiber weight | Polysiloxane found on sheet - % of total dry fiber weight | % retention |
|---|---|---|---|---|
| 17 | 0.48% | 0% | 0.18% | 38% |
| 18 (invention) | 0.48% | 0.1% | 0.30% | 62% |
| 19 | 0.96% | 0% | 0.16% | 16% |
| 20 (invention) | 0.96% | 0.1% | 0.39% | 40% |

It will be appreciated that the foregoing examples, given for purposes of illustration, are not to be considered as limiting the scope of the present invention, which is defined by the following claims and all equivalents thereto.

We claim:

1. A synthetic co-polymer derived from the reaction of an aldehyde functional polymer and an aldehyde reactive paper modifying agent containing a non-hydroxyl aldehyde reactive functional group, said synthetic co-polymer having the following structure:

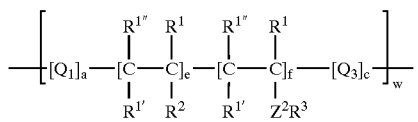

wherein:
f>0;
a, c, e≧0;
w≧1;
$Q_1$=a monomer unit or a block or graft copolymer prepared from the polymerization of one or more ethylenically unsaturated compounds containing a pendant group capable of forming hydrogen bonds with cellulose;

$R^1$, $R^{1'}$, $R^{1''}$=independently H or $C_{1-4}$ alkyl;
$R^2$=any linear or branched, aliphatic or aromatic, saturated or unsaturated, substituted or unsubstituted hydrocarbon group containing a pendant aldehyde functionality;
$R^3$=a polysiloxane;
$Z^2$=a covalently bonded bridging radical formed by the reaction of an aldehyde functionality with a reactive entity on the aldehyde reactive paper modifying agent; and,
$Q_3$=a monomer unit or a block or graft copolymer containing a charge functionality wherein the charge functionality is selected from the group consisting of: cationic; anionic; and, amphoteric.

2. The synthetic co-polymer of claim 1, wherein the pendant group on $Q_1$ capable of forming hydrogen bonds is selected from the group consisting of: —CONH$_2$; —COOH; —COO$^-$M$^+$; —OH; and, mixtures thereof, wherein M$^+$ is a counter ion.

3. The synthetic co-polymer of claim 1, wherein the hydrocarbon group $R^2$ containing aldehyde functionality is selected from the group consisting of: —CONHCHOHCHO; —CONHCHOH(CH$_2$)$_2$CHO; and, mixtures thereof.

4. The synthetic co-polymer of claim 1, wherein the aldehyde functional polymer is selected from the group consisting of: water dispersible anionic aldehyde functional polymers; water dispersible cationic aldehyde functional polymers; water dispersible non-ionic aldehyde functional polymers; water-soluble anionic aldehyde functional polymers; water-soluble cationic aldehyde functional polymers; and, water-soluble non-ionic aldehyde functional polymers.

5. The synthetic co-polymer of claim 1, wherein the $R^3$ moiety is a linear or branched, saturated or unsaturated, aromatic or aliphatic hydrocarbon of $C_2$ to $C_{40}$ chain length.

6. The synthetic co-polymer of claim 1, wherein the synthetic co-polymer is a product of the reaction of the aldehyde functional polymer and the aldehyde reactive paper modifying agent containing wherein the aldehyde reactive paper modifying agent is a polysiloxane and having the following structure:

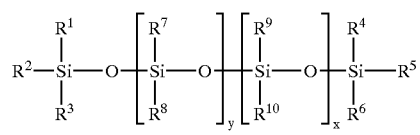

wherein:
x, y=integers>0 such that the mole ratio of x to (x+y) is from about 0.001 percent to about 25 percent; and,
$R^1$, $R^2$, $R^3$, $R^4$, $R^5$, $R^6$, $R^7$, $R^8$, and $R^9$ moieties are independently any organofunctional group including $C_1$ to $C_{30}$ alkyl groups, ethers, polyethers, polyesters, amines, imines, amides, or other functional groups including the alkyl and alkenyl analogues of such groups,
wherein at least one of $R^2$, $R^5$, and $R^{10}$ moieties is an organofunctional moiety containing a non-hydroxyl functional group capable of reacting with an aldehyde group to form a covalent bond.

7. The synthetic co-polymer of claim 6, wherein the aldehyde functional polymer is a cationic, anionic, or non-ionic glyoxylated polyacrylamide and the polysiloxane organofunctional moiety capable of reacting with an aldehyde group that is a primary amine, secondary amine, or unsubstituted amide.

8. The synthetic co-polymer of claim 1, wherein the synthetic co-polymer is the product of the reaction of an aldehyde functional polymer and an amphiphilic paper modifying agent containing a non-hydroxyl aldehyde reactive group.

9. The synthetic co-polymer of claim 8, wherein the aldehyde functional polymer is a cationic, anionic, or non-ionic glyoxylated polyacrylamide and the aldehyde reactive functional group on the amphiphilic paper modifying agent is selected from the group consisting of: primary amine; secondary amine; and, unsubstituted amide.

10. The synthetic co-polymer of claim 8, wherein the aldehyde reactive paper modifying agent is selected from the group consisting of: 1-amino-2-propanol; 2-amino-1-propanol; 3-amino-1,2-propanediol; tris(hydroxymethyl) aminomethane; diethanol amine; 1-amino-1-deoxy-D-sorbitol(glucamine); glucosamine; N-methyl glucamine; 2-aminoethyl hydrogen sulfate; 2-amino-2-ethyl-1,3-propanediol; 2-amino-1phenyl-1,3-propanediol; 2-amino-1,3-propanediol; 3-amino-1-propanol; ethanolamine; 3-amino-2-hydroxy propionic acid; 1-amino-2,3,4-trihydroxybutane; 4-amino-2-hydroxybutyric acid; aspartic acid; 2-amino-2-methyl-1,3-propanediol; 2-amino-1,3-propanediol; 3-mercapto-1,2-propanediol; mercaptosuccinic acid; and, mixtures thereof.

11. The synthetic co-polymer of claim 8, wherein the aldehyde reactive paper modifying agent is a derivative of a polyalkyleneoxy functional compound.

12. The synthetic co-polymer of claim 8, wherein the aldehyde reactive paper modifying agent is a polyalkyleneoxy amine, diamine, thiol, dithiol, unsubstituted amide, or unsubstituted diamide.

13. The synthetic co-polymer of claim 8, wherein the aldehyde reactive paper modifying agent is selected from the group consisting of: polyalkyleneoxy amine; diamine; thiol; and, dithiol, and having the following structure:

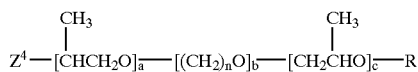

wherein:
Z$^4$=a non-hydroxyl aldehyde reactive functionality selected from the group consisting of: primary amine; secondary amine; thiol; or, unsubstituted amide;
a, b, c=integers greater $\geq 0$ such that a+b+c$\geq$2;
n=an integer$\geq$2 and $\leq$6; and,
R=H; $C_1$–$C_{30}$ linear or branched, substituted or non-substituted, aliphatic or aromatic, saturated or unsaturated hydrocarbon; —[CH$_2$CHCH$_3$]—Z$^4$; or, —[(CH$_2$)$_n$]—Z$^4$.

14. The synthetic co-polymer of claim 8, wherein the aldehyde reactive paper modifying agent is an amino acid.

15. The synthetic co-polymer of claim 1, wherein the Z$^2$ moiety is selected from the group consisting of: —CONHCHOHCHOHNH—; —CONHCHOHCH=N—; —CONHCHOHCH(NH—)$_2$; and, mixtures thereof.

16. The synthetic co-polymer of claim 1, wherein Q$_3$ is

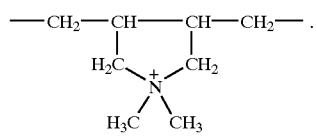

17. The synthetic co-polymer of claim 1, wherein Q$_3$ is a radical of the form —CHR$^1$CR$^0$R$^{1'}$— wherein:

R$^0$=a pendant group of the form Z$_1$-R$_{10}$-W, where Z$_1$ is a radical bonding the R$^{10}$ group to the synthetic co-polymer;
R$^1$, R$_1{'}$=independently H or a C$_{1-4}$ alkyl group;
R$^{10}$=any linear or branched, aliphatic or aromatic hydrocarbon of at least a C$_2$ chain length; and,
W=—N$^+$R$^{11}$, R$^{12}$, R$^{13}$ where R$^{11}$, R$^{12}$, and R$^{13}$ are each independently a C$_{1-4}$ alkyl group.

18. The synthetic co-polymer of claim 1, wherein the pendant group on Q$_1$ capable of forming hydrogen bonds is —CONH$_2$.

19. The synthetic co-polymer of claim 1, wherein Q$_1$ has —CONH$_2$ and —Z$^5$R' pendant groups wherein Z$^5$ is a bridging radical bonding the R' group to the synthetic co-polymer and R' is a C$_1$ to C$_{30}$ aliphatic hydrocarbon.

20. A paper sheet comprising a synthetic co-polymer derived from the reaction of an aldehyde functional polymer and an aldehyde reactive paper modifying agent containing an aldehyde reactive functional group, said synthetic co-polymer having the following structure:

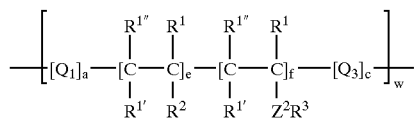

wherein:
f>0;
a, c, e$\geq$0;
w$\geq$1;
Q$_1$=a monomer unit or a block or graft copolymer prepared from the polymerization of one or more ethylenically unsaturated compounds containing a pendant group capable of forming hydrogen bonds with cellulose;
R$^1$, R$^{1'}$, R$^{1''}$=independently H or C$_{1-4}$ alkyl;
R$^2$=any linear or branched, aliphatic or aromatic, saturated or unsaturated, substituted or unsubstituted hydrocarbon group containing a pendant aldehyde functionality;
R$^3$=a polysiloxane;
Z$^2$=a covalently bonded bridging radical formed by the reaction of an aldehyde functionality with a reactive entity on the aldehyde reactive paper modifying agent; and,
Q$_3$=a monomer unit or a block or graft copolymer containing a charge functionality wherein the charge functionality is selected from the group consisting of: cationic; anionic; and, amphoteric.

21. The paper sheet of claim 20, wherein the pendant group on Q$_1$ capable of forming hydrogen bonds is selected from the group consisting of: —CONH$_2$; —COOH; —COO$^-$M$^+$; —OH; and, mixtures thereof, wherein M$^+$ is a counter ion.

22. The paper sheet of claim 20, wherein the hydrocarbon group R$^2$ containing aldehyde functionality is selected from the group consisting of: —CONHCHOHCHO; —CONHCHOH(CH$_2$)$_2$CHO; and, mixtures thereof.

23. The paper sheet of claim 20, wherein the aldehyde functional polymer is selected from the group consisting of: water dispersible anionic aldehyde functional polymers; water dispersible cationic aldehyde functional polymers; water dispersible non-ionic aldehyde functional polymers; water-soluble anionic aldehyde functional polymers; water-soluble cationic aldehyde functional polymers; and, water-soluble non-ionic aldehyde functional polymers.

24. The paper sheet of claim 20, wherein the $R^3$ moiety is a linear or branched, saturated or unsaturated, aromatic or aliphatic hydrocarbon of at least a $C_2$ to $C_{40}$ chain length.

25. The paper sheet claim 20, wherein the synthetic co-polymer is a product of the reaction of the aldehyde functional polymer and the aldehyde reactive paper modifying agent wherein the aldehyde reactive paper modifying agent is a polysiloxane and having the following structure:

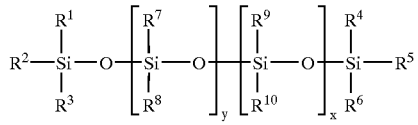

wherein:
x, y=integers>0 such that the mole ratio of x to (x+y) is from about 0.001 percent to about 25 percent; and,
$R^1$, $R^2$, $R^3$, $R^4$, $R^5$, $R^6$, $R^7$, R8, and $R^9$ moeities are independently any organfunctional group including $C_1$ to $C_{30}$ alkyl groups, ethers, polyethers, polyesters, amines, imines, amides, or other functional groups including the alkyl and alkenyl analogues of such groups,
wherein at least one of $R^2$, $R^5$, and $R^{10}$ moieties is an organofunctional moiety containing a non-hydroxyl functional group capable of reacting with an aldehyde group to form a covalent bond.

26. The paper sheet of claim 25, wherein the aldehyde functional polymer is a cationic, anionic, or non-ionic gly-oxylated polyacrylamide and the polysiloxane organofunctional moiety capable of reacting with an aldehyde group is a primary amine, secondary amine, or unsubstituted amide.

27. The paper sheet of claim 20, wherein the synthetic co-polymer is the product of the reaction of an aldehyde functional polymer and an amphiphilic hydrocarbon paper modifying agent containing a non-hydroxyl aldehyde reactive group.

28. The paper sheet of claim 27, wherein the aldehyde functional polymer is a cationic, anionic, or non-ionic gly-oxylated polyacrylamide and the aldehyde reactive functional group on the amphiphilic paper modifying agent is selected from the group consisting of: primary amine; secondary amine; and, unsubstituted amide.

29. The paper sheet of claim 27, wherein the aldehyde reactive paper modifying agent is selected from the group consisting of: 1-amino-2-propanol; 2-amino-1-propanol; 3-amino-1,2-propanediol; tris(hydroxymethyl) aminomethane; diethanol amine; 1-amino-1-deoxy-D-sorbitol(glucamine); glucosamine; N-methyl glucamine; 2-aminoethyl hydrogen sulfate; 2-amino-2-ethyl-1,3-propanediol; 2-amino-1phenyl-1,3-propanediol; 2-amino-1, 3-propanediol; 3-amino-1-propanol; ethanolamine; 3-amino-2-hydroxy propionic acid; 1-amino-2,3,4-trihydroxybutane; 4-amino-2-hydroxybutyric acid; aspartic acid; 2-amino-2-methyl-1,3-propanediol; 2-amino-1,3-propanediol; 3-mercapto-1,2-propanediol; mercaptosuccinic acid; and, mixtures thereof.

30. The paper sheet of claim 27, wherein the aldehyde reactive paper modifying agent is a derivative of a poly-alkyleneoxy functional compound.

31. The paper sheet of claim 27, wherein the aldehyde reactive paper modifying agent is a polyalkyleneoxy amine, diamine, thiol, dithiol, unsubstituted amide, or unsubstituted diamide.

32. The paper sheet of claim 27, wherein the aldehyde reactive agent is a polyalkyleneoxy compound of the following structure:

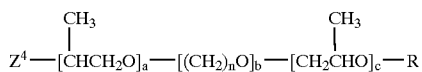

Wherein:

$Z^4$=a non-hydroxyl aldehyde reactive functionality selected from the group consisting of: primary amine; secondary amine; thiol; or, unsubstituted amide;

a, b, c=integers greater$\geq 0$ such that a+b+c$\geq 2$;

n=an integer$\geq 2$ and$\leq 6$; and,

R=H; $C_1$–$C_{30}$ linear or branched, substituted or non-substituted, aliphatic or aromatic, saturated or unsaturated hydrocarbon; —[$CH_2CHCH_3$]—$Z^4$; or, —[$(CH_2)_n$]—$Z^4$.

33. The paper sheet of claim 27, wherein the aldehyde reactive paper modifying agent is an amino acid.

34. The paper sheet of claim 20, wherein the $Z^2$ moiety is selected from the group consisting of: —CONHCHOHCHOHNH—; —CONHCHOHCH=N—; —CONHCHOHCH(NH—)$_2$; and, mixtures thereof.

35. The paper sheet of claim 20, wherein $Q_3$ is

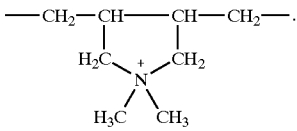

36. The paper sheet of claim 20, wherein $Q_3$ is a radical of the form —$CHR^1CR^0R^{1'}$—wherein:

$R^0$=a pendant group of the form $Z_1$—$R_{10}$—W, where $Z_1$ is a radical bonding the $R^{10}$ group to the synthetic co-polymer;

$R^1$, $R_1{'}$=independently H or a $C_{1-4}$ alkyl group;

$R^{10}$=any linear or branched, aliphatic or aromatic hydrocarbon of at least a $C_2$ chain length; and, W=—$N^+R^{11}$, $R^{12}$, $R^{13}$ where $R^{11}$, $R^{12}$, and $R^{13}$ are each independently a $C_{1-4}$ alkyl group.

37. The paper sheet of claim 20, wherein the pendant group on $Q_1$ capable of forming hydrogen bonds is —$CONH_2$.

38. The paper sheet of claim 20, wherein $Q_1$ has —$CONH_2$ and —$Z^5R'$ pendant groups wherein $Z^5$ is a bridging radical bonding the R' group to the synthetic co-polymer and R' is a $C_1$–$C_{30}$ aliphatic hydrocarbon.

39. A method of making a paper sheet comprising: (a) forming an aqueous suspension of papermaking fibers; (b) contacting prior to web formation a paper modifying agent having a non-hydroxyl aldehyde reactive functional group and a water soluble or water dispersible aldehyde functional ionic polymer according to the following reaction:

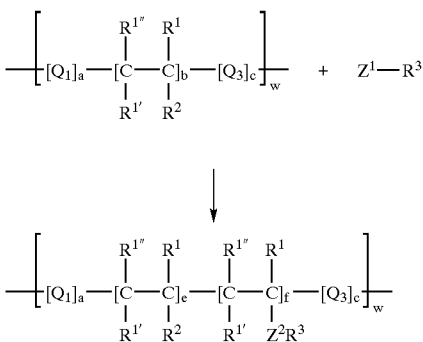

(c) applying the aldehyde functional ionic polymer reacted with derivatized paper modifying agent to the aqueous suspension of papermaking fibers; (d) depositing the aqueous suspension of papermaking fibers onto a forming fabric to form a web; and, (e) dewatering and drying the web to form a paper sheet, wherein:

b, c, f>0;

a, e≧0;

e+f=b;

w≧1;

$Q_1$=a monomer unit or a block or graft copolymer prepared from the polymerization of one or more ethylenically unsaturated compounds and containing a pendant group capable of forming hydrogen bonds with cellulose;

$R^1$, $R^{1'}$, $R^{1''}$=independently H or $C_{1-4}$ alkyl;

$R^2$=any linear or branched, aliphatic or aromatic, saturated or unsaturated, substituted or unsubstituted hydrocarbon group containing a pendant aldehyde functionality;

$R^3$=a polysiloxane;

$Z^3$=a reactive group capable of reacting with an aldehyde in an aqueous environment to form a covalent bond which is stable in an aqueous solution;

$Z^2$=the covalently bonded bridging radical formed by the reaction of the aldehyde functionality with $Z^1$ functional moiety; and, $Q_3$=a monomer unit or a block or graft copolymer containing a charge functionality wherein the charge functionality is selected from the group consisting of: cationic; anionic; and, amphoteric.

40. The method of claim 39, wherein the pendant group on $Q_1$ capable of forming hydrogen bonds is selected from the group consisting of: —$CONH_2$; —COOH; —COO⁻M⁺; —OH; and, mixtures thereof, wherein M⁺ is a counter ion.

41. The method of claim 39, wherein M⁺ is a counter ion selected from the group consisting of: Na⁺; K⁺; Ca⁺; and, mixtures thereof.

42. The method of claim 39, wherein $R^2$ is $Z^4$—$R^{2'}$—$Z^{3'}$ wherein $Z^4$ is any bridging radical capable of incorporating the aldehyde functional group into the synthetic co-polymer and $Z^3$ is the aldehyde functional group selected from the group consisting of: —CHO; —$CH(OH)_2$; and, mixtures thereof.

43. The method of claim 39, wherein $Z^3$ is selected from the group consisting of: primary amines —$NH_2$; secondary amines —NH—, amides —$CONH_2$; thiols —SH; sulfinic acids —$SO_2OH$; sulfonamides —$SO_2NH_2$; and, mixtures thereof.

44. The method of claim 39, wherein the hydrocarbon group $R^2$ containing aldehyde functionality is selected from the group consisting of: —CONHCHOHCHO; —CONHCHOH$(CH_2)_2$CHO; and, mixtures thereof.

45. The method of claim 39, wherein the aldehyde functional polymer is selected from the group consisting of: water dispersible anionic aldehyde functional polymers; water dispersible cationic aldehyde functional polymers; water dispersible non-ionic aldehyde functional polymers; water-soluble anionic aldehyde functional polymers; water-soluble cationic aldehyde functional polymers; and, water-soluble non-ionic aldehyde functional polymers.

46. The method of claim 39, wherein the $R^3$ moiety is a linear or branched, saturated or unsaturated, aromatic or aliphatic hydrocarbon of $C_2$ to $C_{40}$ chain length.

47. The method of claim 39, wherein the paper modifying agent is a polysiloxane of the structure:

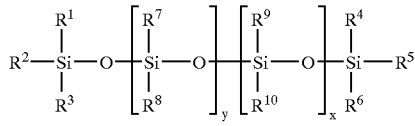

wherein:

x, y=integers>0 such that the mole ratio of x to (x+y) is from about 0.001 percent to about 25 percent; and, $R^1$, $R^2$, $R^3$, $R^4$, $R^5$, $R^6$, $R^7$, $R^8$, and $R^9$ moieties are independently any organofunctional group including $C_1$ to $C_{30}$ alkyl groups, ethers, polyethers, polyesters, amines, imines, amides, or other functional groups including the alkyl and alkenyl analogues of such groups, wherein at least one of $R^2$, $R^5$, and $R^{10}$ moieties is an organofunctional moiety containing a non-hydroxyl functional group capable of reacting with an aldehyde group to form a covalent bond.

48. The method of claim 47, wherein the aldehyde functional polymer is a cationic, anionic, or non-ionic glyoxylated polyacrylamide and the polysiloxane organofunctional moiety capable of reacting with an aldehyde group is a primary amine, secondary amine, or unsubstituted amide.

49. The method of claim 39, wherein the aldehyde reactive paper modifying agent is an amphiphilic hydrocarbon, polyether, or polyhydroxy compound containing a non-hydroxyl aldehyde reactive group.

50. The method of claim 49, wherein the aldehyde functional polymer is a cationic, anionic, or non-ionic glyoxylated polyacrylamide and the non-hydroxyl aldehyde reactive functional group of the aldehyde reactive paper modifying agent is a primary amine, secondary amine or unsubstituted amide.

51. The method of claim 49, wherein the aldehyde reactive paper modifying agent is selected from the group consisting of: 1-amino-2-propanol; 2-amino-1-propanol; 3-amino-1,2-propanediol; tris(hydroxymethyl) aminomethane; diethanol amine; 1-amino-1-deoxy-D-sorbitol(glucamine); glucosamine; N-methyl glucamine; 2-aminoethyl hydrogen sulfate; 2-amino-2-ethyl-1,3-propanediol; 2-amino-1phenyl-1,3-propanediol; 2-amino-1, 3-propanediol; 3-amino-1-propanol; ethanolamine; 3-amino-2-hydroxy propionic acid; 1-amino-2,3,4-trihydroxybutyric acid; 4-amino-2-hydroxybutyric acid; aspartic acid; 2-amino-2-methyl-1,3-propanediol; 2-amino-1,3-propanediol; 3-mercapto-1,2-propanediol; mercaptosuccinic acid; and, mixtures thereof.

52. The method of claim 49, wherein the aldehyde reactive paper modifying agent is a derivative of a polyalkyleneoxy functional compound.

53. The method of claim 49, wherein the aldehyde reactive paper modifying agent is a polyalkyleneoxy amine, diamine, thiol, dithiol, unsubstituted amide, or unsubstituted diamide.

54. The method of claim 49, wherein the aldehyde reactive paper modifying agent is a polyalkyleneoxy compound having the following structure:

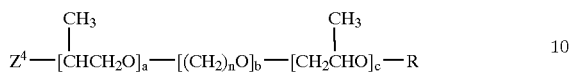

wherein:
- $Z^4$=a non-hydroxyl aldehyde reactive functionality selected from the group consisting of: primary amine; secondary amine; thiol; or, unsubstituted amide;
- a, b, c=integers greater $\geq 0$ such that $a+b+c \geq 2$;
- n=an integer $\geq 2$ and $\leq 6$; and,
- R=H; $C_1$–$C_{30}$ linear or branched, substituted or non-substituted, aliphatic or aromatic, saturated or unsaturated hydrocarbon; —[$CH_2CHCH_3$]—$Z^4$; or, —[$(CH_2)_n$]—$Z^4$.

55. The method of claim 49, wherein the aldehyde reactive paper modifying agent is an amino acid.

56. The method of claim 39, wherein the $Z^2$ moiety is selected from the group consisting of: —CONHCHOHCHOHNH—; —CONHCHOHCH=N—, —CONHCHOHCH(NH—)$_2$; and, mixtures thereof.

57. The method of claim 39, wherein $Q_3$ is

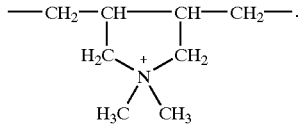

58. The method of claim 39, wherein $Q_3$ is a radical of the form —$CHR^1CR^OR^{1'}$—
wherein:

$R^O$=a pendant group of the form $Z_1$—$R_{10}$—W, where $Z_1$ is a radical bonding the $R^{10}$ group to the synthetic co-polymer;

$R^1$, $R_1'$=independently H or a $C_{1-4}$ alkyl group;

$R^{10}$=any linear or branched, aliphatic or aromatic hydrocarbon of at least a $C_2$ chain length; and, W=—$N^+R^{11}$, $R^{12}$, $R^{13}$ where $R^{11}$, $R^{12}$, and $R^{13}$ are each independently a $C_{1-4}$ alkyl group.

59. The method of claim 39, wherein the pendant group on $Q_1$ capable of forming hydrogen bonds is —$CONH_2$.

60. The method of claim 39, wherein $Q_1$ has —$CONH_2$ and —$Z^5R'$ pendant groups wherein $Z^5$ is a bridging radical bonding the R' group to the synthetic co-polymer and R' is a $C_1$–$C_{30}$ aliphatic hydrocarbon.

61. The method of claim 39, wherein the aldehyde functional polymer is first added to the papermaking fibers prior to the addition of the aldehyde reactive paper modifying agent having a non-hydroxyl aldehyde reactive group.

62. The method of claim 39, further comprising filtering and washing the papermaking fibers containing the aldehyde functional ionic polymer reacted with derivatized paper modifying agent.

63. The method of claim 62, further comprising resuspending the papermaking fibers.

64. The method of claim 39, wherein e=0.

65. The method of claim 39, wherein e>0.

66. The method of claim 39, further comprising adding a molar excess of the derivatized paper modifying agent having a non-hydroxyl aldehyde reactive functional group relative to the number of available aldehyde groups on the aldehyde functional ionic polymer.

67. The method of claim 66, further comprising filtering and washing the papermaking fibers thereby removing excess of the paper modifying agent having a non-hydroxyl aldehyde reactive functional group.

* * * * *